United States Patent
Francis

(10) Patent No.: US 10,739,960 B2
(45) Date of Patent: Aug. 11, 2020

(54) PERFORMING APPLICATION-SPECIFIC SEARCHES USING TOUCHSCREEN-ENABLED COMPUTING DEVICES

(71) Applicant: Samsung Electronics Co., Ltd., Suwon-si, Gyeonggi-do (KR)

(72) Inventor: Thomas Francis, Dubuque, IA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 14/980,909

(22) Filed: Dec. 28, 2015

(65) Prior Publication Data

US 2017/0083591 A1   Mar. 23, 2017

Related U.S. Application Data

(60) Provisional application No. 62/221,767, filed on Sep. 22, 2015.

(51) Int. Cl.
| | |
|---|---|
| *G06F 16/951* | (2019.01) |
| *G06F 3/0484* | (2013.01) |
| *G06F 3/0481* | (2013.01) |
| *G06F 3/0488* | (2013.01) |

(52) U.S. Cl.
CPC ........ *G06F 3/04842* (2013.01); *G06F 3/0488* (2013.01); *G06F 3/04817* (2013.01); *G06F 16/951* (2019.01)

(58) Field of Classification Search
CPC .................................................. G06F 17/30864
USPC .......................................................... 707/706
See application file for complete search history.

(56) References Cited

U.S. PATENT DOCUMENTS

| | | | | |
|---|---|---|---|---|
| 5,943,399 A | * | 8/1999 | Bannister | H04M 3/533 370/493 |
| 5,974,413 A | * | 10/1999 | Beauregard | G06F 9/45512 |
| 6,144,667 A | * | 11/2000 | Doshi | H04L 29/06 370/352 |
| 6,167,469 A | * | 12/2000 | Safai | H04N 1/00209 348/157 |
| 6,400,997 B1 | * | 6/2002 | Rapp, III | G06Q 10/06311 340/6.11 |
| 6,430,282 B1 | * | 8/2002 | Bannister | H04M 3/382 379/211.02 |
| 6,687,745 B1 | * | 2/2004 | Franco | G06F 8/60 709/219 |
| 7,325,029 B1 | * | 1/2008 | Chang | G06Q 30/02 370/352 |
| 7,603,349 B1 | * | 10/2009 | Kraft | G06F 17/30867 |
| 7,730,081 B2 | * | 6/2010 | Bromm | G06Q 10/107 707/769 |
| 8,683,355 B1 | * | 3/2014 | Gailloux | H04L 51/10 709/204 |

(Continued)

*Primary Examiner* — Baoquoc N To
(74) *Attorney, Agent, or Firm* — Jefferson IP Law, LLP

(57) ABSTRACT

Systems and methods are provided and include receiving, at a touchscreen of a user device, a user input from a user of the user device, the user input selecting an application (app) icon displayed at the touchscreen. The user device receives a search query from the user. In response to receiving the user input and the search query, the user device generates search results based on the search query, each search result specifying a state of a native app associated with the app icon. The user device displays the search results to the user.

22 Claims, 15 Drawing Sheets

(56) References Cited

U.S. PATENT DOCUMENTS

| | | | | |
|---|---|---|---|---|
| 8,843,488 | B1* | 9/2014 | Chong | G06F 17/30882 707/736 |
| 9,268,734 | B1* | 2/2016 | Ward | G06F 15/0291 |
| 9,584,991 | B1* | 2/2017 | Daniel | H04W 4/14 |
| 9,787,822 | B1* | 10/2017 | Holland | H04M 1/72566 |
| 9,886,794 | B2* | 2/2018 | van Os | G01C 21/00 |
| 2002/0002453 | A1* | 1/2002 | Lazaridis | G06F 17/2765 704/9 |
| 2002/0105550 | A1* | 8/2002 | Biebesheimer | G06F 17/30696 715/835 |
| 2002/0149614 | A1* | 10/2002 | Biebesheimer | G06F 17/30528 715/738 |
| 2003/0099341 | A1* | 5/2003 | Williams | H04M 3/533 379/211.02 |
| 2004/0015490 | A1* | 1/2004 | Snyder | G06F 17/30864 |
| 2004/0117233 | A1* | 6/2004 | Rapp, III | G05B 19/4183 700/96 |
| 2004/0253568 | A1* | 12/2004 | Shaver-Troup | G09B 17/00 434/178 |
| 2004/0267585 | A1* | 12/2004 | Anderson | G06Q 10/02 705/5 |
| 2005/0289109 | A1* | 12/2005 | Arrouye | G06F 17/301 |
| 2006/0256816 | A1* | 11/2006 | Yarlagadda | H04L 29/06027 370/466 |
| 2007/0005581 | A1* | 1/2007 | Arrouye | G06F 17/30126 |
| 2007/0061242 | A1* | 3/2007 | Ramer | G06Q 10/10 705/37 |
| 2007/0174124 | A1* | 7/2007 | Zagofsky | G06Q 30/02 705/14.46 |
| 2008/0122796 | A1* | 5/2008 | Jobs | G06F 3/0488 345/173 |
| 2008/0175359 | A1* | 7/2008 | Karmazyn | G06F 3/0238 719/318 |
| 2008/0219427 | A1* | 9/2008 | Naono | H04M 3/42374 379/218.01 |
| 2008/0244647 | A1* | 10/2008 | Choi | H04N 5/4401 725/38 |
| 2009/0016507 | A1* | 1/2009 | Altberg | G06Q 30/02 379/114.01 |
| 2010/0235726 | A1* | 9/2010 | Ording | G06F 1/1626 715/234 |
| 2010/0250243 | A1* | 9/2010 | Schalk | G10L 15/22 704/201 |
| 2010/0258534 | A1* | 10/2010 | Hughes | B23K 9/167 219/75 |
| 2011/0064205 | A1* | 3/2011 | Boni | H04M 11/04 379/45 |
| 2011/0286586 | A1* | 11/2011 | Saylor | H04M 3/493 379/88.13 |
| 2011/0301843 | A1* | 12/2011 | Gale | G09B 29/007 701/300 |
| 2012/0036121 | A1* | 2/2012 | Jitkoff | G06F 3/167 707/722 |
| 2012/0253823 | A1* | 10/2012 | Schalk | G01C 21/3608 704/270.1 |
| 2012/0284297 | A1* | 11/2012 | Aguera-Arcas | G06F 3/03547 707/769 |
| 2012/0290977 | A1* | 11/2012 | Devecka | H04W 4/21 715/810 |
| 2012/0315009 | A1* | 12/2012 | Evans | H04N 5/765 386/230 |
| 2013/0035856 | A1* | 2/2013 | Connors | G06F 8/60 701/484 |
| 2013/0073969 | A1* | 3/2013 | Blank | G06F 9/44505 715/738 |
| 2013/0097501 | A1* | 4/2013 | Jiang | G06F 3/0482 715/716 |
| 2013/0104052 | A1* | 4/2013 | Chang | H04L 12/2805 715/752 |
| 2013/0173521 | A1* | 7/2013 | Pirlet | G06N 5/02 706/47 |
| 2013/0218923 | A1* | 8/2013 | Kaul | H04M 1/72522 707/769 |
| 2013/0272511 | A1* | 10/2013 | Bouzid | H04M 3/493 379/88.01 |
| 2013/0298049 | A1* | 11/2013 | Lyndersay | G06F 3/0481 715/760 |
| 2013/0321340 | A1* | 12/2013 | Seo | G06F 1/1641 345/174 |
| 2013/0322634 | A1* | 12/2013 | Bennett | G10L 21/00 381/17 |
| 2013/0334300 | A1* | 12/2013 | Evans | G06F 17/30017 235/375 |
| 2013/0345980 | A1* | 12/2013 | van Os | G01C 21/3626 701/538 |
| 2014/0052450 | A1* | 2/2014 | Cheong | H04N 21/42203 704/275 |
| 2014/0052451 | A1* | 2/2014 | Cheong | H04N 21/42203 704/275 |
| 2014/0052452 | A1* | 2/2014 | Koivuniemi | H04N 21/42203 704/275 |
| 2014/0052453 | A1* | 2/2014 | Koivuniemi | H04N 21/4622 704/275 |
| 2014/0053209 | A1* | 2/2014 | Young | H04N 21/42203 725/53 |
| 2014/0053210 | A1* | 2/2014 | Cheong | H04N 21/42203 725/53 |
| 2014/0096067 | A1* | 4/2014 | Finke | G06F 3/0484 715/780 |
| 2014/0207815 | A1* | 7/2014 | Grinev | G06F 17/30746 707/769 |
| 2014/0236986 | A1* | 8/2014 | Guzman | G06F 17/30011 707/769 |
| 2014/0372220 | A1* | 12/2014 | Peterson | G06Q 50/01 705/14.55 |
| 2015/0006564 | A1* | 1/2015 | Tomkins | G06F 17/3064 707/767 |
| 2015/0052115 | A1* | 2/2015 | Sharifi | G06Q 30/0631 707/722 |
| 2015/0052460 | A1* | 2/2015 | Mohammad Mirzaei | G06F 3/0484 715/764 |
| 2015/0193546 | A1* | 7/2015 | Lipton | G06F 9/445 717/178 |
| 2015/0254367 | A1* | 9/2015 | Kagan | G06F 3/0482 707/706 |
| 2015/0262419 | A1* | 9/2015 | Maa | G06T 17/00 703/1 |
| 2015/0339348 | A1* | 11/2015 | Joo | G06F 17/3005 707/722 |
| 2015/0339391 | A1* | 11/2015 | Kang | G06F 17/30867 707/722 |
| 2015/0373428 | A1* | 12/2015 | Trollope | H04N 21/8133 704/235 |
| 2015/0379993 | A1* | 12/2015 | Subhojit | G10L 15/06 704/275 |
| 2016/0062599 | A1* | 3/2016 | Ko | G06F 17/30864 715/738 |
| 2016/0085753 | A1* | 3/2016 | Wong | G06F 16/951 707/734 |
| 2016/0117388 | A1* | 4/2016 | Fan | G06F 17/30864 717/178 |
| 2016/0189717 | A1* | 6/2016 | Kannan | G10L 17/22 704/275 |
| 2016/0350304 | A1* | 12/2016 | Aggarwal | G10L 15/1822 |
| 2016/0360336 | A1* | 12/2016 | Gross | H04W 4/025 |

* cited by examiner

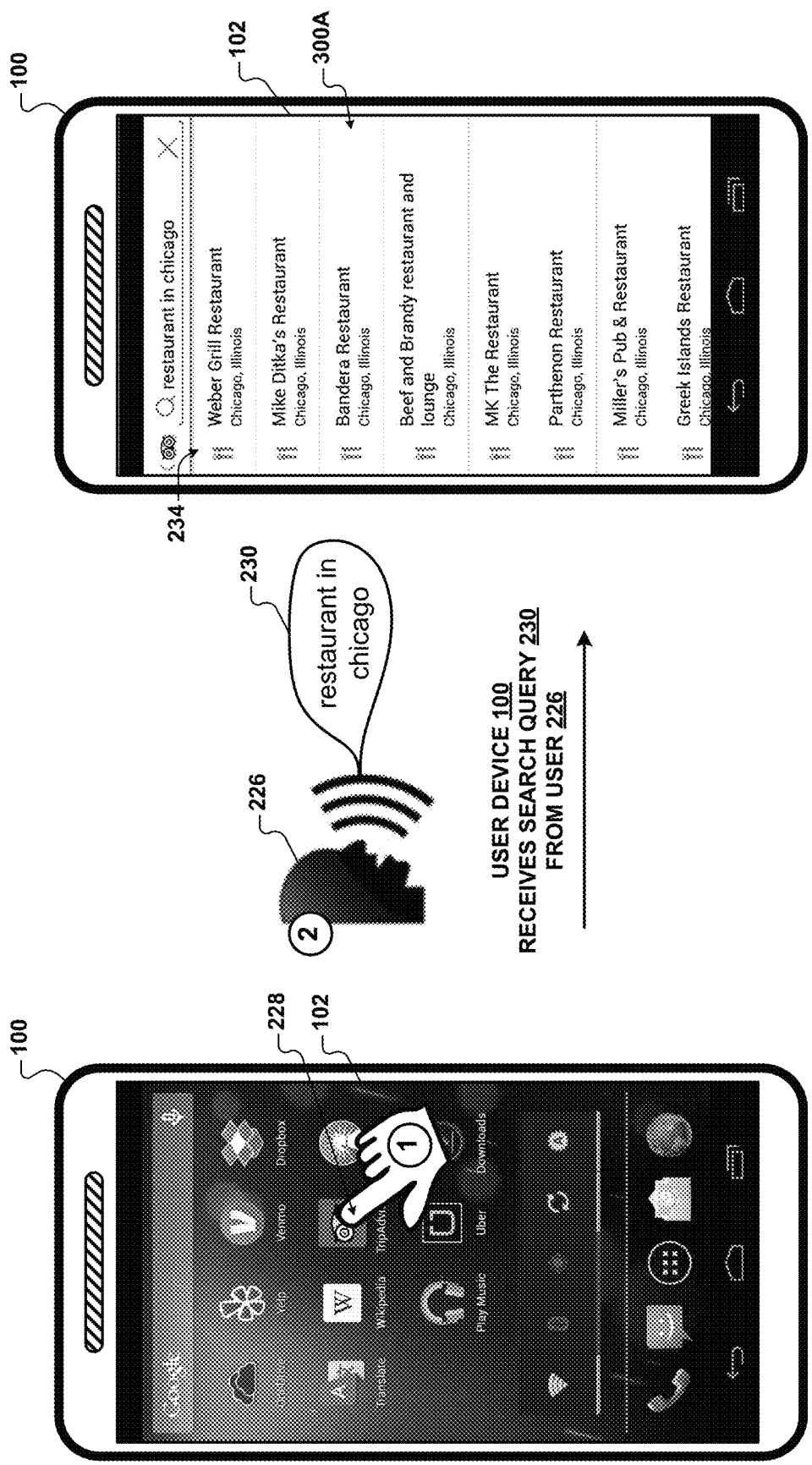

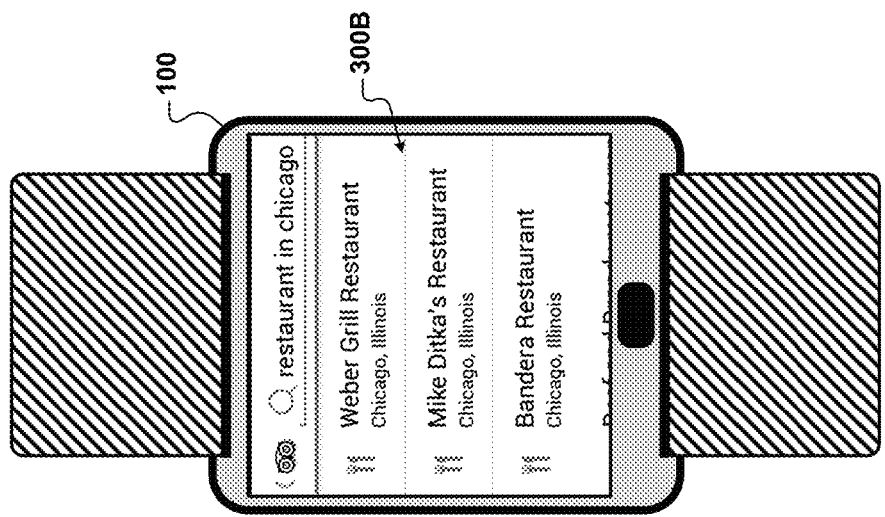
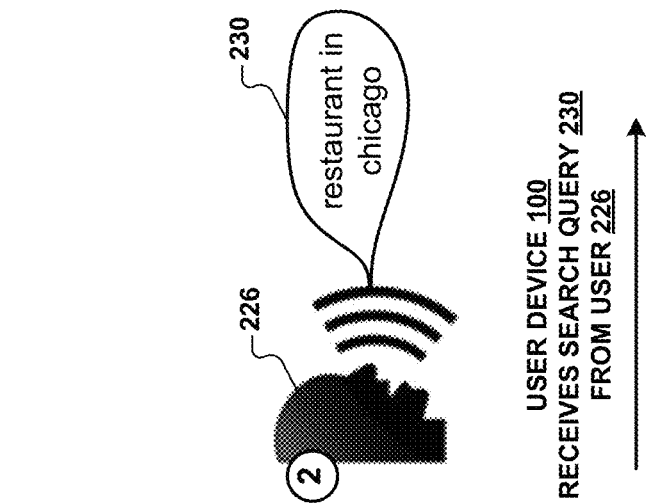
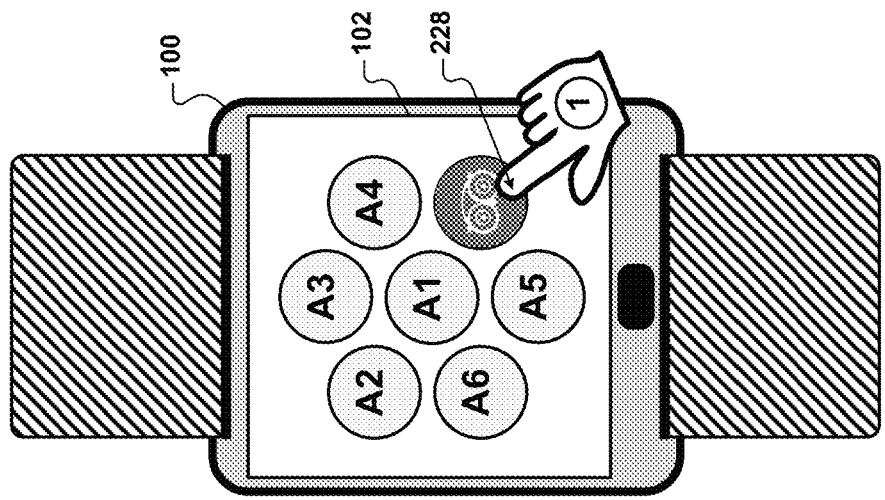
FIG. 3D
FIG. 3C

PERFORMING APPLICATION-SPECIFIC SEARCHES USING TOUCHSCREEN-ENABLED COMPUTING DEVICES

CROSS-REFERENCE TO RELATED APPLICATIONS

This application claims the benefit of U.S. Provisional Application No. 62/221,767, filed on Sep. 22, 2015. The entire disclosure of the application referenced above is incorporated herein by reference.

TECHNICAL FIELD

This disclosure generally relates to the field of search, and more particularly to techniques for performing searches using touchscreen-enabled computing devices.

BACKGROUND

In recent years, the use of computers, tablets, smartphones, smart watches, and other stationary and mobile computing devices has grown significantly. Additionally, the inclusion of various touchscreen devices configured to receive user inputs at display screens of these and other computing devices has also increased. Today, many consumer and industrial computing devices and appliances are capable of receiving user inputs at display screens via a variety of different touchscreen technologies, including resistive, capacitive, surface-acoustic-wave (SAW), optical, and other touchscreen types.

Moreover, the number of software applications (apps) available for these and other devices has also grown. Today, many diverse software apps can be accessed on various computing devices. The software apps include business driven apps, games, educational apps, news apps, shopping apps, messaging apps, media streaming apps, and social networking apps, as some examples. Because of the large number of software apps available today and the wide range of functionality they provide, computing device users often require the ability to search for and access specific software app functionality.

SUMMARY

In one example, a method includes receiving, at a touchscreen of a user device, a user input from a user of the user device. In this example, the user input selects an application (app) icon displayed at the touchscreen. The method further includes receiving, at the user device, a search query from the user. The method still further includes, in response to receiving the user input and the search query, generating, using the user device, search results based on the search query. In this example, each search result specifies a state of a native app associated with the app icon. The method also includes displaying, using the user device, the search results to the user.

In other features, the user input can comprise one or more of a finger contact input and a pressure input with respect to the touchscreen.

In other features, the user input can comprise a momentary user input.

In other features, the user input can comprise a prolonged user input having a time duration that is longer than a momentary user input.

In other features, the user input can comprise a predetermined user gesture with respect to the touchscreen.

In other features, receiving the user input and the search query from the user can comprise receiving the search query while receiving the user input.

In other features, receiving the user input and the search query from the user can comprise receiving the search query following receiving the user input.

In other features, receiving the search query from the user can comprise receiving the search query via voice input.

In other features, receiving the search query from the user can comprise receiving the search query via text input.

In other features, receiving the search query from the user can comprise providing, using the user device, a user prompt to the user and in response to providing the user prompt, receiving the search query from the user.

In other features, providing the user prompt to the can comprise providing one or more of the following to the user: a visual output at the touchscreen; a sound output; a voice command output; and a vibration output.

In other features, generating the search results in response to receiving the user input and the search query can comprise determining, using the user device, a storage location included on the user device and corresponding to the native app associated with the app icon, performing, using the user device, a search of the storage location using the search query, and generating, using the user device, the search results based on performing the search.

In other features, generating the search results in response to receiving the user input and the search query can comprise determining, using the user device, an app programming interface (API) corresponding to the native app associated with the app icon, querying, using the user device, the API using the search query, and receiving, at the user device, the search results from the API in response to querying the API.

In other features, generating the search results in response to receiving the user input and the search query can comprises transmitting, using the user device, the search query to a search system configured to generate search results in response to a received search query and receiving, at the user device, the search results from the search system in response to transmitting the search query.

In other features, the method can further comprise transmitting, using the user device, an indication of the native app associated with the app icon to the search system, wherein receiving the search results from the search system comprises receiving the search results in response to transmitting the indication.

In other features, generating the search results in response to receiving the user input and the search query can comprise launching, using the user device, the native app associated with the app icon, and providing, using the user device, one or more commands to the launched native app, the one or more commands configured to cause the native app to generate the search results.

In other features, the search results can include one or more app access mechanisms (AAMs), wherein each AAM references the native app associated with the app icon and indicates one or more operations for the native app to perform, and wherein the native app performing the one or more operations sets the native app into one of the one or more states within the native app.

In other features, displaying the search results to the user can comprise displaying the search results at the touchscreen as one or more user selectable links.

In other features, displaying the search results to the user can comprise forwarding the search results for display as one or more user selectable links to a computing device other than the user device.

In other features, displaying the search results to the user can comprise launching, using the user device, the native app associated with the app icon and displaying, using a graphical user interface (GUI) of the launched native app, the search results to the user as one or more user selectable links.

In another example, a system includes one or more computing devices configured to receive, at a touchscreen of a user device, a user input from a user of the user device. In this example, the user input selects an app icon displayed at the touchscreen. The one or more computing devices are further configured to receive, at the user device, a search query from the user. The one or more computing devices are still further configured to, in response to receiving the user input and the search query, generate, using the user device, search results based on the search query. In this example, each search result specifies a state of a native app associated with the app icon. The one or more computing devices are also configured to display, using the user device, the search results to the user.

In another example, a non-transitory computer-readable storage medium includes instructions that cause one or more computing devices to receive, at a touchscreen of a user device, a user input from a user of the user device. In this example, the user input selects an app icon displayed at the touchscreen. The instructions further cause the one or more computing devices to receive, at the user device, a search query from the user. The instructions still further cause the one or more computing devices to, in response to receiving the user input and the search query, generate, using the user device, search results based on the search query. In this example, each search result specifies a state of a native app associated with the app icon. The instructions also cause the one or more computing devices to display, using the user device, the search results to the user.

In another example, a computing device comprises a touchscreen configured to display an application (app) icon and receive a user input from a user of the computing device, an input/output component configured to receive a search query from the user, one or more memory components configured to store computer-readable instructions, and one or more processing units configured to execute the computer-readable instructions. The computer-readable instructions, when executed by the one or more processing units, cause the one or more processing units to receive the user input from the user at the touchscreen, the user input selecting the app icon displayed at the touchscreen, receive the search query from the user using the input/output component, in response to receiving the user input and the search query, generate one or more search results based on the search query, each search result specifying a state of a native app associated with the app icon, and display the one or more search results to the user.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

FIGS. 3A-4F illustrate example graphical user interfaces (GUIs) that may be generated on a user device according to this disclosure.

DETAILED DESCRIPTION

Figure 1B:
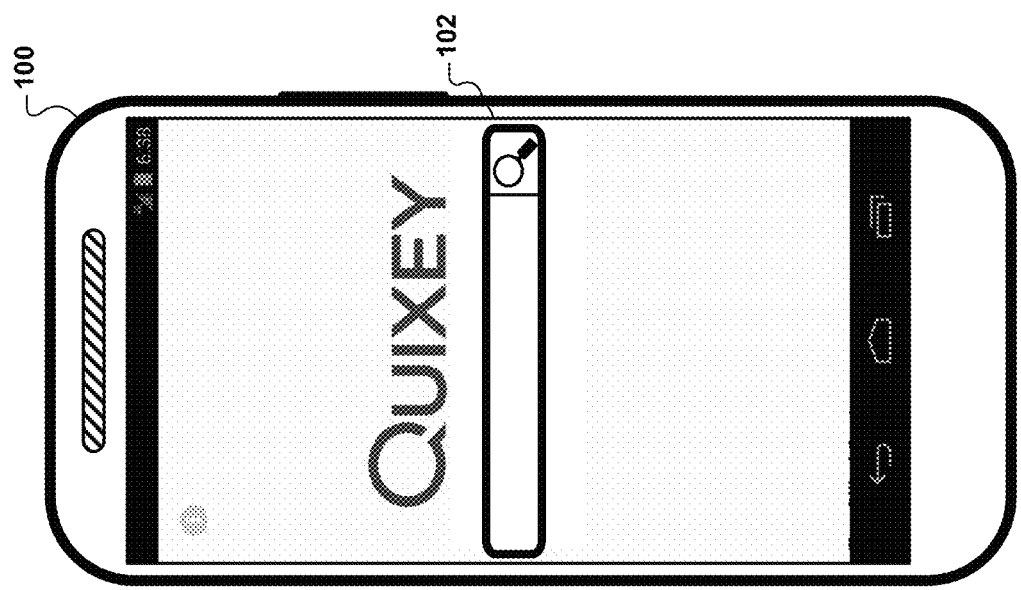
FIGS. 1A-1B illustrate example user devices that may be used to implement the techniques of the present disclosure.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of search, and, more particularly, to techniques for performing searches for states of native apps using computing devices equipped with touchscreen-enabled display screens (e.g., laptops, tablets, smartphones, and smart watches). Specifically, the techniques of this disclosure are directed to computing devices configured to receive user inputs, including one or more of finger contact inputs and pressure inputs, from users via display screens capable of detecting (e.g., sensing) the inputs. For example, to receive the pressure inputs, the display screens may include resistive touchscreens, push-button-based touchscreens, or other pressure-sensitive sensors or input devices. Additionally, or alternatively, to receive the finger contact inputs, the display screens may include capacitive touchscreens or other finger contact-sensitive sensors or input devices.

According to the techniques disclosed herein, a user device (e.g., a smartphone or a smart watch) may receive a user input from a user at a touchscreen of the device. For example, the user input may include one or more of a finger contact input and a pressure input received from the user at the touchscreen. In this example, the user input may select an app icon displayed at the touchscreen (e.g., select an area of a display screen of the user device, which includes a touchscreen, used to display the icon). For example, the app icon may be associated with a native app that is installed on the user device. The user device may further receive a search query from the user (e.g., during or following receiving the user input from the user). For example, the user device may receive the search query using any of a voice input and a text input by the user. In some examples, to receive the search query, the user device may first provide a user prompt (e.g., a visual, audible, and/or haptic output) to the user. In these examples, the user prompt may be configured to cause the user to provide the search query to the user device.

In response to receiving the user input and search query from the user, the user device may generate one or more search results based on the search query. In this example, each search result may both be responsive to the search query and specify a state of a native app that is associated with the app icon selected by the user input. In some examples, the user device may generate the search results locally (e.g., by performing a search of a local storage location used by the native app using the search query). In other examples, the user device may generate the search results by querying an API associated with the native app using the search query and receiving the results in response to querying the API. In still other examples, the user device may generate the search results by transmitting the search query to a search system and receiving the results in response to transmitting the query. In some examples, to generate the search results, the user device may launch the native app and generate the results using (e.g., within) the launched app. The user device may then display the search results to the user, e.g., as one or more user selectable links. As one example, the user device may display the search results as the user selectable links at a display screen (e.g., that includes the touchscreen) of the device. For example, the user device may launch the native app and display the search results using (e.g., within) the launched app. As another example, the user device may forward the search results for display as the user selectable links to another (e.g., nearby) computing device.

In this manner, the techniques described herein may improve the way users interact with computing devices that include touchscreen-enabled display screens to perform searches for states of native apps. Specifically, the techniques may enable a user of a user device to perform a search for states of a native app that is installed on the device by interacting directly with an app icon associated with the app and displayed at a touchscreen of the device. As a result, the techniques may enable the user to avoid the inconvenience of first launching the native app on the user device, and subsequently performing the search for the states within the launched app. Using the techniques described herein may, in some examples, improve the user's experience when performing the search for the states of the native app using the user device.

Figure 1A:
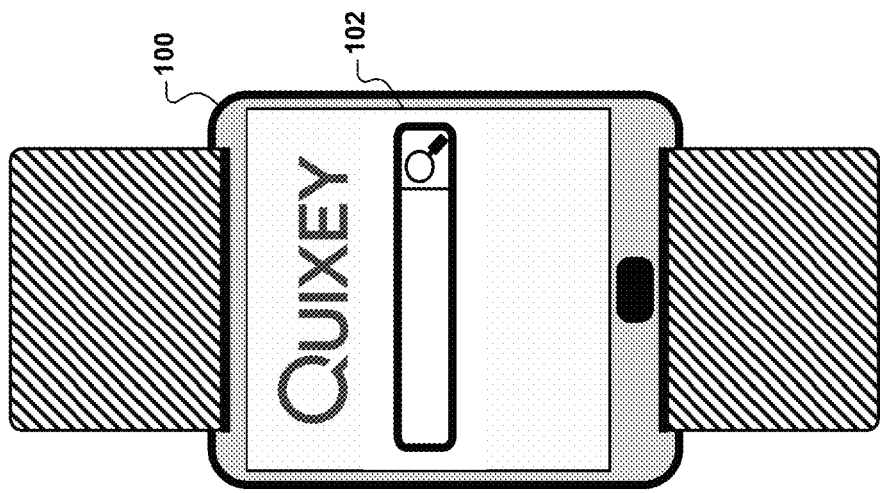

FIGS. 1A-1B illustrate example user devices 100 that may be used to implement the techniques of the present disclosure. As shown in FIG. 1A, the user device 100 may be a smart watch computing device configured to be worn around a user's wrist. Alternatively, as shown in FIG. 1B, the user device 100 may be a smartphone computing device configured to be held in a user's palm. In other examples, the user device 100 may be a tablet, a laptop computer, or a desktop computer. In still other examples, the user device 100 may be a computing device having another form factor, such as a computing device included in a vehicle, a gaming device, a television, or another appliance (e.g., a networked home automation device or appliance).

In general, the user device 100 of this disclosure may be any computing device that includes a touchscreen 102 (e.g., a user input device layered over a display screen and configured to receive finger contact and/or pressure inputs from a user). The touchscreen 102 may be configured to receive user inputs from users of the user device 100, as described herein. For example, the touchscreen 102 may be configured to receive finger contact inputs from the users (e.g., the touchscreen 102 may be a capacitive touchscreen configured to detect user finger contacts, such as user finger taps and swipes). For instance, the touchscreen 102 may be configured to receive user inputs generated using any of fingers of the users' hands, other parts of the users' bodies (e.g., portions of the users' palms), and other objects that are not part of the users' bodies (e.g., conductive styli), so long as the body parts or objects used are substantially electrically conductive. Additionally, or alternatively, the touchscreen 102 may be configured to receive pressure inputs from the users (e.g., the touchscreen 102 may be a resistive touchscreen configured to detect user pressure inputs, such as user finger or stylus pushes and swipes). For example, the touchscreen 102 may be configured to receive user inputs generated using any of fingers of the users' hands, other parts of the users' bodies, and other objects not part of the users' bodies (e.g., styli), irrespective of the body part or object being electrically conductive.

The user device 100 may also be any computing device that is capable of receiving search queries from the users, as also described herein. For example, the user device 100 may be configured to receive the search queries from the users via voice input (e.g., using one or more microphone devices, such as a mic array, associated electrical circuitry, and speech recognition software included on the device 100).

Additionally, or alternatively, the user device 100 may be configured to receive the search queries from the users via text input (e.g., using a virtual keyboard displayed at the touchscreen 102 or a dedicated keypad included on the device 100).

The user device 100 may also be any computing device that is capable of generating and displaying search results that are responsive to the search queries received from the users and specifying states of particular native apps, as further described herein. As one example, to generate the search results, the user device 100 may be configured to perform searches of local storage locations associated with native apps that are installed on the device 100 using the search queries. As another example, to generate the search results, the user device 100 may be configured to query APIs corresponding to native apps that are installed on the device 100 using the search queries. As still another example, to generate the search results, the user device 100 may be configured to transmit the search queries to a search system and receive the results from the system in response to transmitting the queries. The user device 100 may be configured to display the search results to the users (e.g., at a display screen including the touchscreen 102 of the device 100, or by forwarding the results for display at another computing device).

The user device 100 may use various different operating systems or platforms. In examples where the user device 100 is a mobile device (e.g., a smart watch or a smartphone), the device 100 may operate using an operating system (OS) such as ANDROID® by Google, Inc., 10S® by Apple, Inc., or WINDOWS PHONE® by Microsoft Corporation. In examples where the user device 100 is a laptop or desktop computer, the device 100 may use an OS such as MICROSOFT WINDOWS® by Microsoft Corporation, MAC OS® by Apple, Inc., or LINUX® (LINUX® is the registered trademark of Linus Torvalds in the U.S. and other countries). The user device 100 may interact with users and/or other devices or systems using operating systems other than those described herein, whether presently available or developed in the future.

Figure 2A:
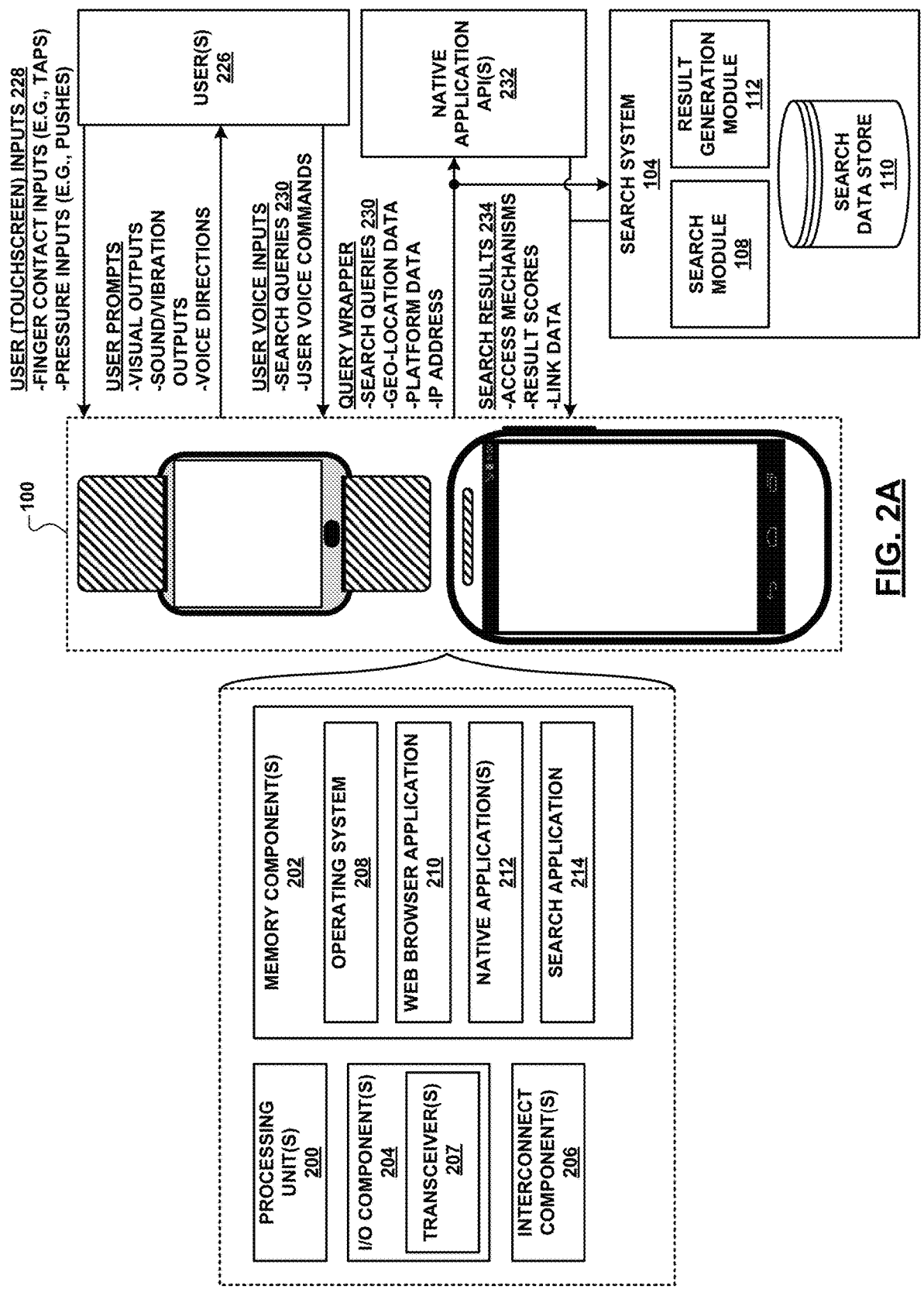
FIGS. 2A-2B are functional block diagrams of an example user device in communication with one or more of a user, an application programming interface (API), and a search system.
Figure 2B:
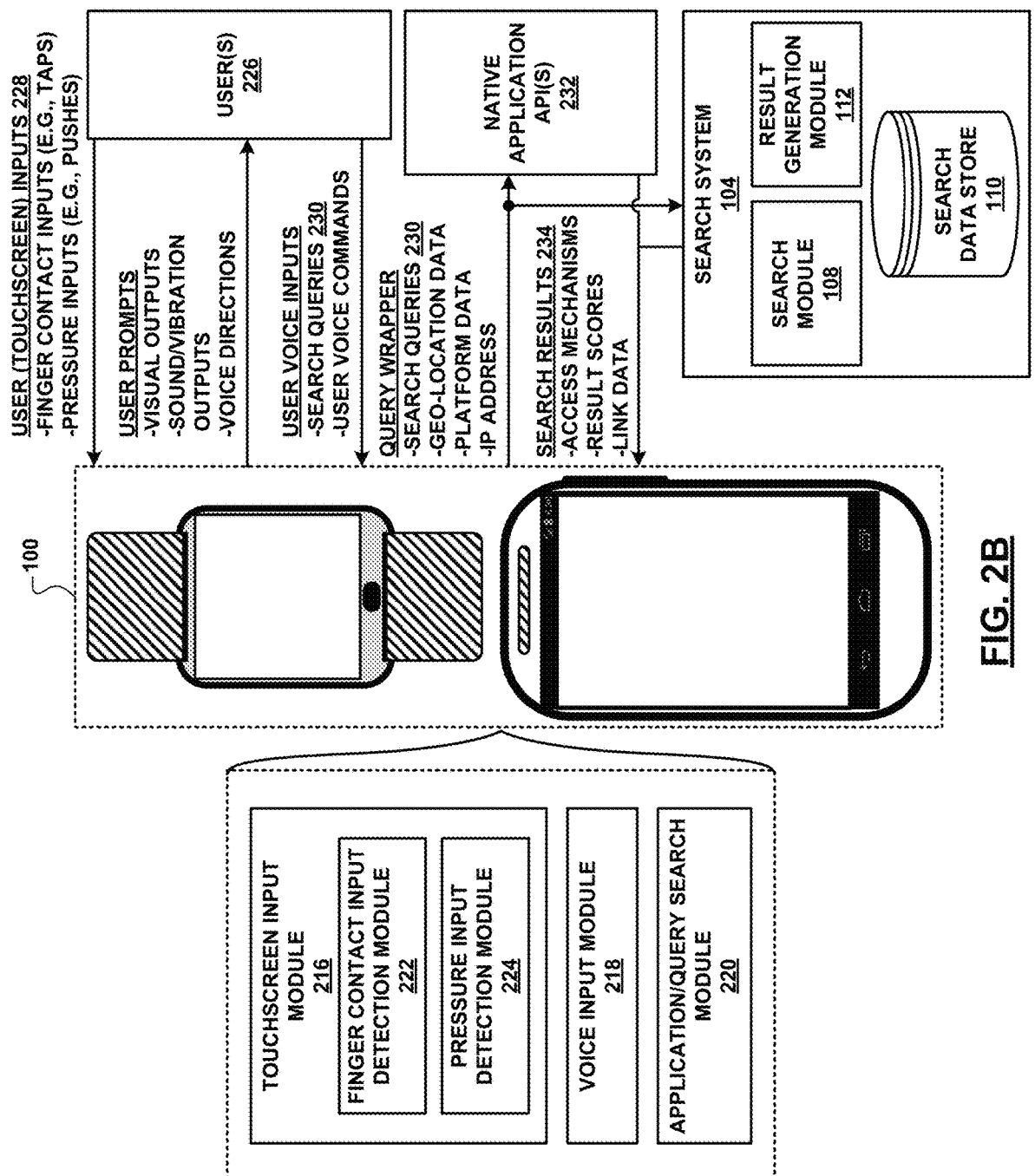

FIGS. 2A and 2B are functional block diagrams of an example user device 100 in communication with one or more users 226, one or more native app programming interfaces (APIs) 232, and/or a search system 104. As shown in FIG. 2A, the user device 100 includes one or more processing units 200, memory component(s) 202, input/output (I/O) components 204, and interconnect components 206. The I/O components 204 may include one or more transceivers 207. As further shown in FIG. 2A, the memory component(s) 202, for example, store code that is executed by the processing unit(s) 200 for an operating system (OS) 208, a web browser application 210, one or more native applications 212 (e.g., that are installed on the user device 100), and a search application 214. For example, the processing unit(s) 200 may be configured to execute instructions stored in the memory component(s) 202 and communicate with the memory component(s) 202 and I/O component(s) 204, including the transceiver(s) 207 (e.g., via the interconnect component(s) 206). Each of the OS 208, web browser app 210, native app(s) 212, and search app 214 may be embodied in computer-executable instructions that are executed by the processing unit(s) 200. The memory component(s) 202 may be configured to store executable instructions, system parameters, and other data in addition to the contents described above.

As shown in FIG. 2B, the user device 100 includes a touchscreen input module 216, a voice input module 218, and an application/query search module 220. As also shown, the touchscreen input module 216 includes a finger contact input detection module 222 and a pressure input detection module 224. The modules may be implemented by and embodied in electronic hardware, software, firmware, and/or any combination thereof. For example, one or more of the touchscreen input module 216, the finger contact input detection module 222, the pressure input detection module 224, the voice input module 218, and the app/query search module 220 may be implemented by and embodied in computer-executable instructions stored in the memory component(s) 202 that are executed by the processing unit(s) 200. Alternatively, one or more of the touchscreen input module 216, the finger contact input detection module 222, the pressure input detection module 224, the voice input module 218, and the app/query search module 220 may be, in whole or in part, implemented by and embodied in hardware that is separate from, but in communication with, the processing unit(s) 200, the memory component(s), and the I/O component(s) 204, including the transceiver(s) 207, via the interconnect component(s) 206.

With reference to FIG. 2A, each of the I/O component(s) 204 may be configured to (e.g., at the direction of the processing unit(s) 200) receive inputs to the user device 100 and transmit outputs from the device 100. In addition, the transceiver(s) 207 may be configured to (e.g., at the direction of the processing unit(s) 200) transmit data to and receive data from other devices in communication with the user device 100. The interconnect component(s) 204 (e.g., a bus) may be configured to provide communication between the processing unit(s) 200, memory component(s) 202, the I/O component(s) 204 (including the transceiver(s) 207), and other systems or devices included in and/or outside the user device 100.

The units, components, and modules of the user device 100 described above may enable the device 100 to perform the techniques attributed to the device 100 in this disclosure. For example, the user device 100 (e.g., the processing unit(s) 200 executing instructions stored in the memory component(s) 202) may be configured to receive (e.g., via the I/O component(s) 204) user inputs 228 from users 226 of the device 100 at a touchscreen 102 of the device 100. In this example, the user inputs 228 may select app icons displayed at the touchscreen 102. In some examples, the user device 100 (e.g., the processing unit(s) 200 executing instructions stored in the memory component(s) 202) may be configured to provide (e.g., via the I/O component(s) 204) user prompts (e.g., visual, audible, and/or haptic outputs) to the users 226. In these examples, the user prompts may be configured to prompt the users 226 to provide search queries 230 to the user device 100. The user device 100 may further receive (e.g., via the I/O component(s) 204) the search queries 230 from the users 226 (e.g., in response to providing the user prompts). The user device 100 (e.g., the processing unit(s) 200 executing instructions stored in the memory component(s) 202) may also be configured to, in response to receiving the user inputs 228 and search queries 230, generate, based on the search queries 230, search results 234 that are responsive to the queries 230 and specify states of native apps that are associated with the app icons selected by the inputs 228. Lastly, the user device 100 may display (e.g., via the I/O component(s) 204) the search results 234 to the users 226 (e.g., as user selectable links).

To perform one or more of receiving the user inputs 228, providing the user prompts, receiving the search queries 230, generating the search results 234, and displaying the results 234, the processing unit(s) 200 may execute one or more instructions included in the memory component(s) 202. For example, the processing unit(s) 200 may execute instructions associated with one or more of the OS 208, web browser app 210, native app(s) 212, search app 214, touchscreen input module 216, voice input module 218, app/query search module 220, finger contact input detection module 222, and pressure input detection module 224. In a specific example, the processing unit(s) 200 may execute instructions that cause the user device 100 to run the OS 208. To receive the user inputs 228 from the user(s) 226, the processing unit(s) 200 may execute instructions that cause the user device 100 to run one or more of the finger contact input detection module 222 and pressure input detection module 224 of the touchscreen input module 216, e.g., within the OS 208. For example, to receive finger contact inputs (e.g., taps) from the user(s) 226 (e.g., in cases where the touchscreen 102 includes a capacitive touchscreen), the processing unit(s) 200 may execute instructions that cause the user device 100 to run the finger contact input detection module 222. Additionally, to receive pressure inputs (e.g., pushes) from the user(s) 226 (e.g., in cases where the touchscreen 102 includes a resistive touchscreen), the processing unit(s) 200 may execute instructions that cause the user device 100 to run the pressure input detection module 224. In general, the touchscreen input module 216, including the finger contact input detection module 222 and pressure input detection module 224, may be one or more dedicated software modules configured to receive user inputs 228 (e.g., finger contact and/or pressure inputs) from the user(s) 226 at the touchscreen 102 of the user device 100.

In some examples, to provide the user prompts to the user(s) 226, the processing unit(s) 200 may execute instructions that cause the user device 100 to run one or more of the web browser app 210, native app(s) 212, and search app 214, e.g., within the OS 208. In other examples, to provide the user prompts to the user(s) 226, the processing unit(s) 200 may execute instructions that cause the user device 100 to run a sound and/or vibration output module (not shown). In general, to provide the user prompts, the user device 100 may run one or more of a web-based app, a native app, and a dedicated software module configured to generate visual, audible, and/or haptic outputs to the user of the user device 100, as described herein.

To receive the search queries 230 from the user(s) 226, the processing unit(s) 200 may further execute instructions that cause the user device 100 to run one or more of the voice input module 218, web browser app 210, native app(s) 212, and search app 214, e.g., within the OS 208. In some examples, to receive the search queries 230, the processing unit(s) 200 may execute instructions that cause the user device 100 to run the voice input module 218 (e.g., in cases where the user device 100 receives the queries 230 from the user(s) 226 via voice input). Alternatively, to receive the search queries 230, the processing unit(s) 200 may execute instructions that cause the user device 100 to run any of the web browser app 210, native app(s) 212, search app 214, and another module (not shown) (e.g., in cases where the user device 100 receives the queries 230 from the user(s) 226 via text input). In general, to receive the search queries 230, the user device 100 may run one or more of a web-based app, a native app, and a dedicated software module configured to receive voice or text inputs (e.g., via a text input field and a virtual keyboard or dedicated keypad) from the user of the device 100, as described herein.

To generate the search results 234 in response to receiving the user inputs 228 and search queries 230, the processing unit(s) 200 may execute instructions that cause the user device 100 to run the app/query search module 220. As one example, the app/query search module 220 may cause the user device 100 to determine a storage (e.g., memory) location included on the device 100. In this example, the storage location may correspond to (e.g., be used by) a native app associated with an app icon that has been selected by a user input 228, as described herein. The app/query search module 220 may then cause the user device 100 to perform a search of the storage location using the search query 230 and generate the search results 234 based on performing the search. As another example, the app/query search module 220 may cause the user device 100 to determine an API that corresponds to (e.g., includes data used by) the native app associated with the selected app icon. The app/query search module 220 may then cause the user device 100 to query the API using the search query 230 and receive the search results 234 from the API in response to querying the API. As still another example, the app/query search module 220 may cause the user device 100 to transmit the search query 230 to a search system 104 configured to generate search results in response to a received search query and receive the search results 234 from the system 104 in response to transmitting the query 230.

To display the search results 234 to the user(s) 226, the processing unit(s) 200 may execute instructions that cause the user device 100 to run one or more modules (not shown) that cause the device 100 to perform any of a variety of actions. As one example, the user device 100 may run a module (not shown) that generates user selectable links for the search results 234 and displays the links to the user(s) 226. For example, the user device 100 may first launch a native app associated with an app icon that has been selected by a user input 228. The user device 100 may then display the search results as the user selectable links within a GUI of the launched native app. As another example, the user device 100 may run a module that forwards the search results 234 (e.g., via a wireless and/or wired communication network) to one or more other (e.g., proximate) computing devices for display as the user selectable links.

FIGS. 3A-4F illustrate example GUIs that may be generated on a user device 100 according to this disclosure. The user device 100 shown in FIGS. 3A-4F is one of a smartphone computing device and a wrist watch computing device (e.g., a smart watch). Example smartphone computing devices include the SAMSUNG S® devices developed by Samsung Electronics Co., Ltd. and the APPLE IPHONE® devices developed by Apple Inc. Example wrist watch computing devices include the SAMSUNG GALAXY GEAR®, SAMSUNG GALAXY GEAR® 2, SAMSUNG GEAR® 2 Neo, and SAMSUNG GEAR FIT® developed by Samsung Electronics Co., Ltd., as well as the APPLE WATCH® developed by Apple Inc.

As shown in FIG. 3A, initially, the user device 100 (e.g., a smartphone computing device) receives a user input 228 from a user 226 of the device 100 at a touchscreen 102 of the device 100. As also shown, the user input 228 indicates a selection of an app icon that is displayed at the touchscreen 102. As described herein, the app icon may be associated with a native app (e.g., one of the native app(s) 212) that is installed on the user device 100. In the example of FIGS. 3A-3B, the native app associated with the selected app icon corresponds to "TripAdvisor@" by TripAdvisor, LLC (hereinafter, "TripAdvisor"). In this example, the user device 100 further receives a search query 230 of "RESTAURANTS IN CHICAGO" 230 from the user 226 via voice input. In other examples, the user device 100 may receive the search query 230 from the user 226 via text input, as described below with reference to FIGS. 4E-4F. As explained herein, the user device 100 may receive the search query 230 from the user 226 while (e.g., during) receiving the user input 228 from the user 226, or following (e.g., in response to) receiving the input 228. For example, the user 226 may provide a prolonged user input 228 having a time duration that is relatively longer than a momentary user input to the user device 100 and, while continuing to provide the input 228, also provide the search query 230 to the device 100 via voice input. Alternatively, the user 226 may provide a momentary user input 228 having a relatively short time duration to the user device 100, and, after completing providing the input 228, provide the search query 230 to the device 100 via voice input. In still other examples, the user 226 may provide the user input 228 to the user device 100 in the form of a predetermined user gesture with respect to the selected app icon. For example, the user input 228 may correspond to a motion that fully or partially encircles the app icon on the touchscreen 102.

In any case, in the example of FIGS. 3A-3B, in response to receiving the user input 228 and search query 230 from the user 226, the user device 100 generates one or more search results 234 based on the query 230. In some examples, the user device 100 may generate the search results 234 in response to (e.g., upon) receiving the search query 230. In other examples, in cases where the user 226 provides the search query 230 to the user device 100 while providing a prolonged user input 228, the device 100 may generate the search results 234 in response to (e.g., upon) the user 226 terminating the input 228 (e.g., upon the user 226 removing a finger or stylus from the touchscreen 102 of the device 100).

In this example, aside from being responsive to the search query 230, each search result 234 also specifies a state of the native app associated with the selected app icon (i.e., TripAdvisor). For example, to generate the search results 234, the user device 100 may perform a search of a local storage location associated with TripAdvisor using the search query 230, query an API corresponding to TripAdvisor using the query 230, or transmit the query 230 to a search system 104. In some examples, to perform the search of the local storage location associated with TripAdvisor using the search query 230 and/or to query the API corresponding to TripAdvisor using the query 230, the user device 100 (e.g., the app/query search module 220) may first launch TripAdvisor and subsequently perform the search or query the API through (e.g., via) the launched TripAdvisor (e.g., by directing TripAdvisor using one or more commands). In other examples, to transmit the search query 230 to the search system 104 (and, e.g., receive the search results 234 from the system 104), the user device 100 (e.g., the app/query search module 220) may execute the search app 214 (e.g., in the background).

As shown in FIG. 3B, upon generating the search results 234 using any of the techniques described above, the user device 100 may display the results 234 at the touchscreen 102 as one or more user selectable links. In the example of FIG. 3B, the user device 100 displays the search results 234 as the user selectable links within a GUI 300A of TripAdvisor that also indicates the search query 230. In other words, in this example, the user device 100 first launches TripAdvisor, and then displays the search results 234 as the user selectable links within the GUI 300A of the launched TripAdvisor. In other examples (not shown), the user device 100 may display the search results 234 as the user selectable links using another GUI (e.g., that of the web browser app 210, any of the native app(s) 212, the search app 214, or another GUI). In still other examples (also not shown), the user device 100 may forward the search results 234 for display as the user selectable links at another computing device.

FIGS. 3C-3D depict GUI elements and user 226/user device 100 interactions that are analogous to those described above with reference to FIGS. 3A-3B. In the example of FIGS. 3C-3D, the user device 100 is a smart watch computing device that displays the search results 234 as the user selectable links within a GUI 300B of TripAdvisor.

Figure 4B:
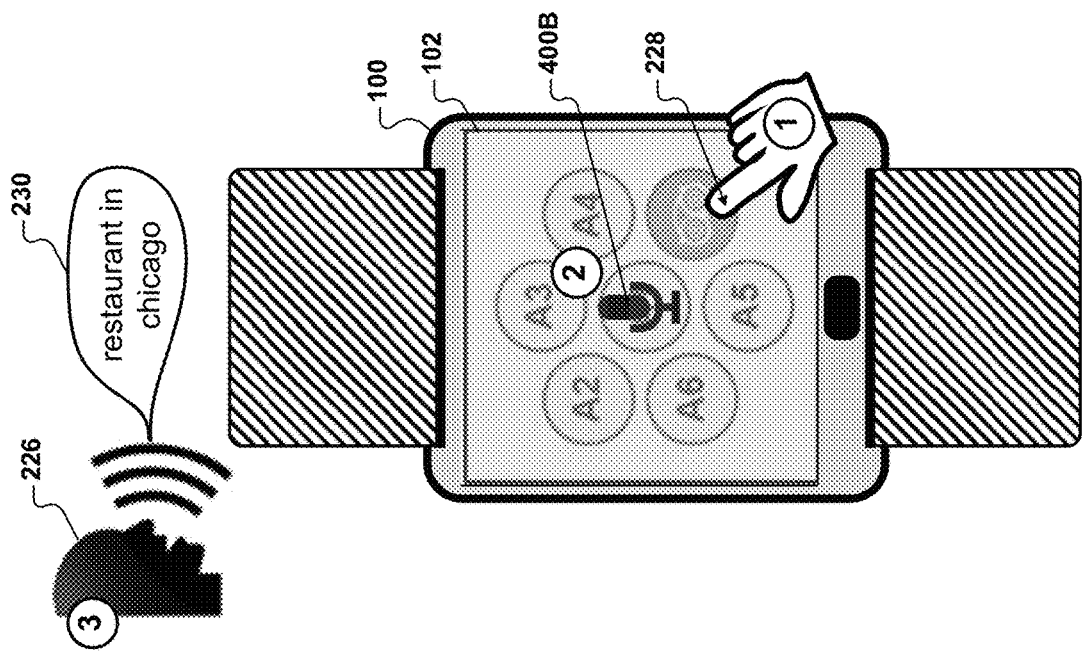
Figure 4A:
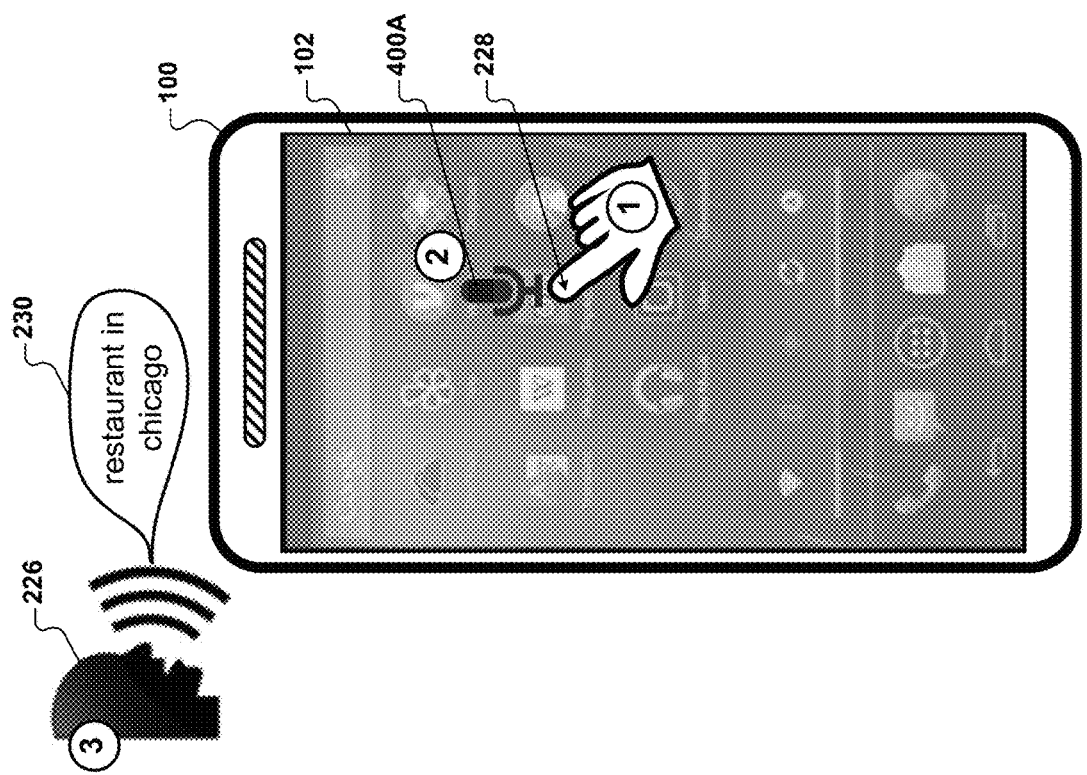

FIGS. 4A-4B illustrate examples in which the user device 100 provides a user prompt 400A, 400B to the user 226 and receives the search query 230 from the user 226 via voice input in response to providing the prompt 400A, 400B. In the example of FIGS. 4A-4B, the user prompt 400A, 400B is a visual output (e.g., a GUI element including an image of a microphone) configured to prompt the user 226 to provide the search query 230 to the user device 100. In other examples, the user prompt 400A, 400B may include any combination of a visual, audible, and/or haptic output, as described herein. As shown in each of FIGS. 4A-4B, initially, the user device 100 receives the user input 228 from the user 226 at the touchscreen 102, in a similar manner as described above with reference to FIGS. 3A-3B. As also shown, upon (e.g., in response to) receiving the user input 228, the user device 100 provides the user prompt 400A, 400B to the user 226 (i.e., displays the GUI element) at the touchscreen 102. As further shown, upon (e.g., in response to) providing the user prompt 400A, 400B to the user 226, the user device 100 receives the search query 230 from the user 226 via voice input.

Figure 4D:
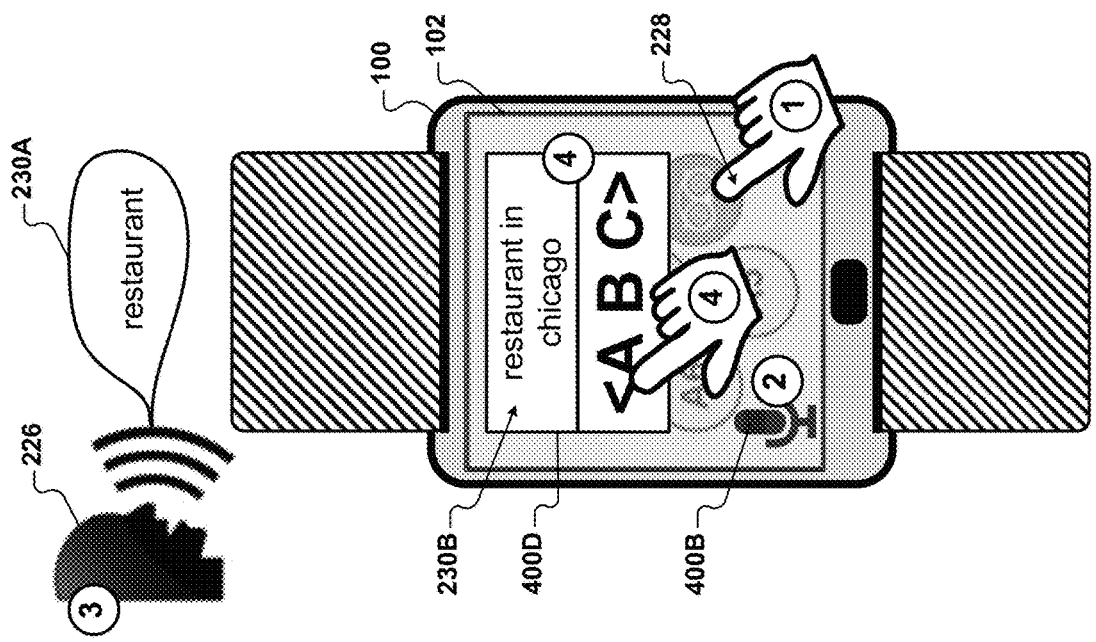
Figure 4C:
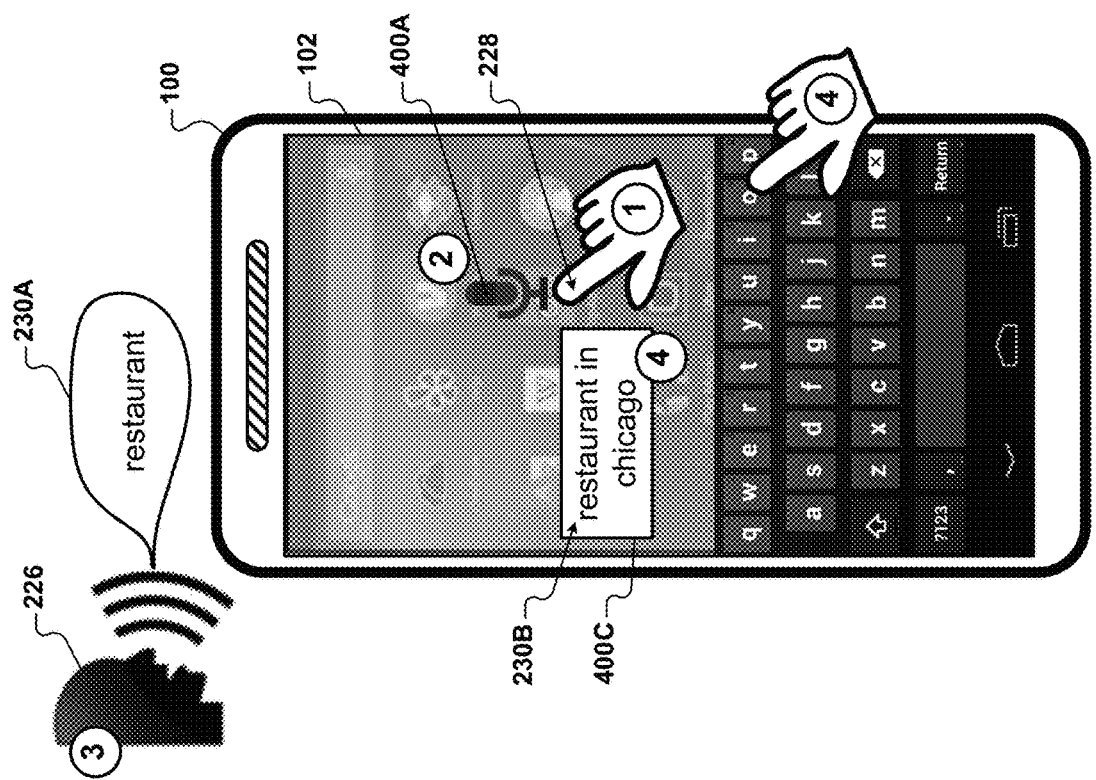

FIGS. 4C-4D illustrate examples in which the user device 100 provides the user prompt 400A, 400B to the user 226, receives an original search query 230A from the user 226 via voice input in response to providing the prompt 400A, 400B, and generates a modified search query 230B using a text input received from the user 226. As shown in each of FIGS. 4C and 4D, initially, the user device 100 receives the user input 228 from the user 226 at the touchscreen 102, in a similar manner as described above with reference to FIGS. 3A-3B. As also shown, upon (e.g., in response to) receiving the user input 228, the user device 100 provides the user prompt 400A, 400B to the user 226 at the touchscreen 102. As further shown, upon (e.g., in response to) providing the user prompt 400A, 400B to the user 226, the user device 100 receives a search query "RESTAURANTS" 230A from the user 226 via voice input. As still further shown, upon receiving the original search query 230A, the user device 100 generates a modified (e.g., revised) search query "RESTAURANTS IN CHICAGO" 230B using a text input received from the user 226 using a text input field 400C, 400D displayed to the user 226 by the device 100. In this example, the user device 100 receives the text input from the user 226 via a virtual keyboard displayed to the user 226 at the touchscreen 102. In other examples, the user device 100 may receive the text input from the user 226 via a dedicated keypad of the device 100.

Figure 4F:
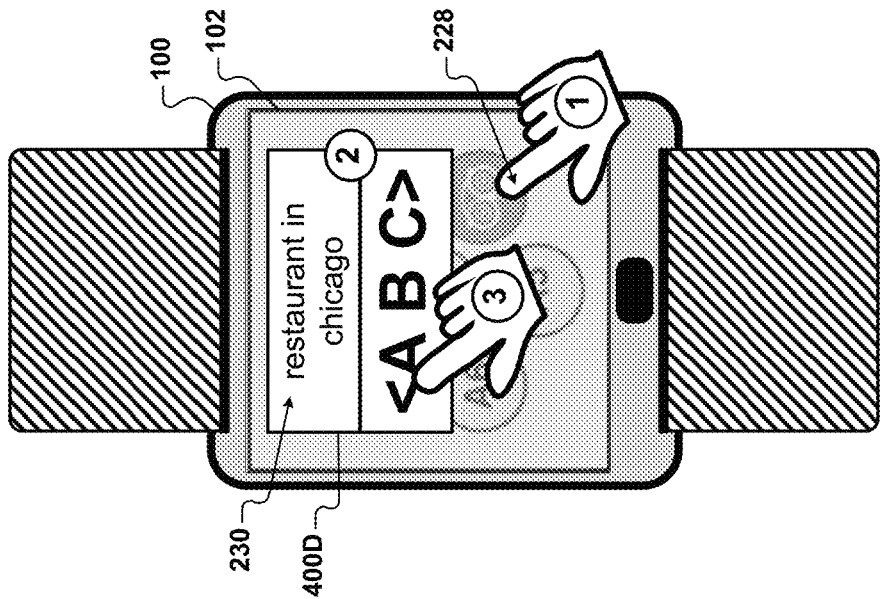
Figure 4E:
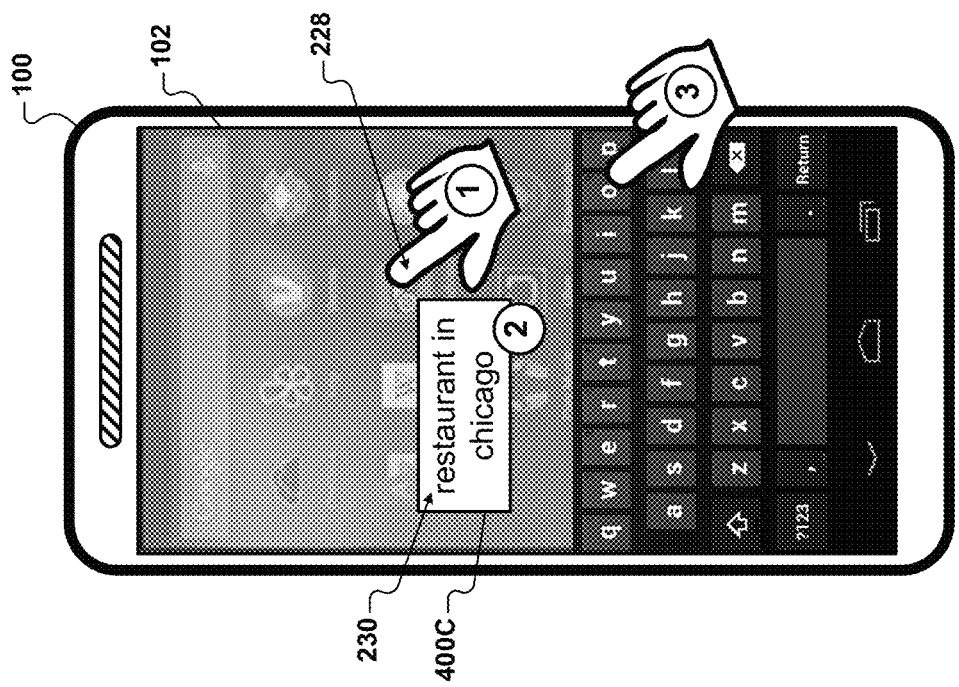

FIGS. 4E and 4F illustrate examples in which the user device 100 receives the search query 230 from the user 226 via text input. As shown in each of FIGS. 4E and 4F, initially, the user device 100 receives the user input 228 from the user 226 at the touchscreen 102, in a similar manner as described above with reference to FIGS. 3A-3B. As also shown, the user device 100 further receives the search query 230 of "RESTAURANTS IN CHICAGO" from the user 226 via text input. In this example, the user device 100 receives the text input from the user 226 using the text input field 400C, 400D displayed to the user 226 by the device 100. Specifically, the user device 100 receives the text input from the user 226 via a virtual keyboard displayed to the user 226 at the touchscreen 102. In other examples, the user device 100 may receive the text input from the user 226 via a dedicated keypad included on the device 100.

Figure 5A:
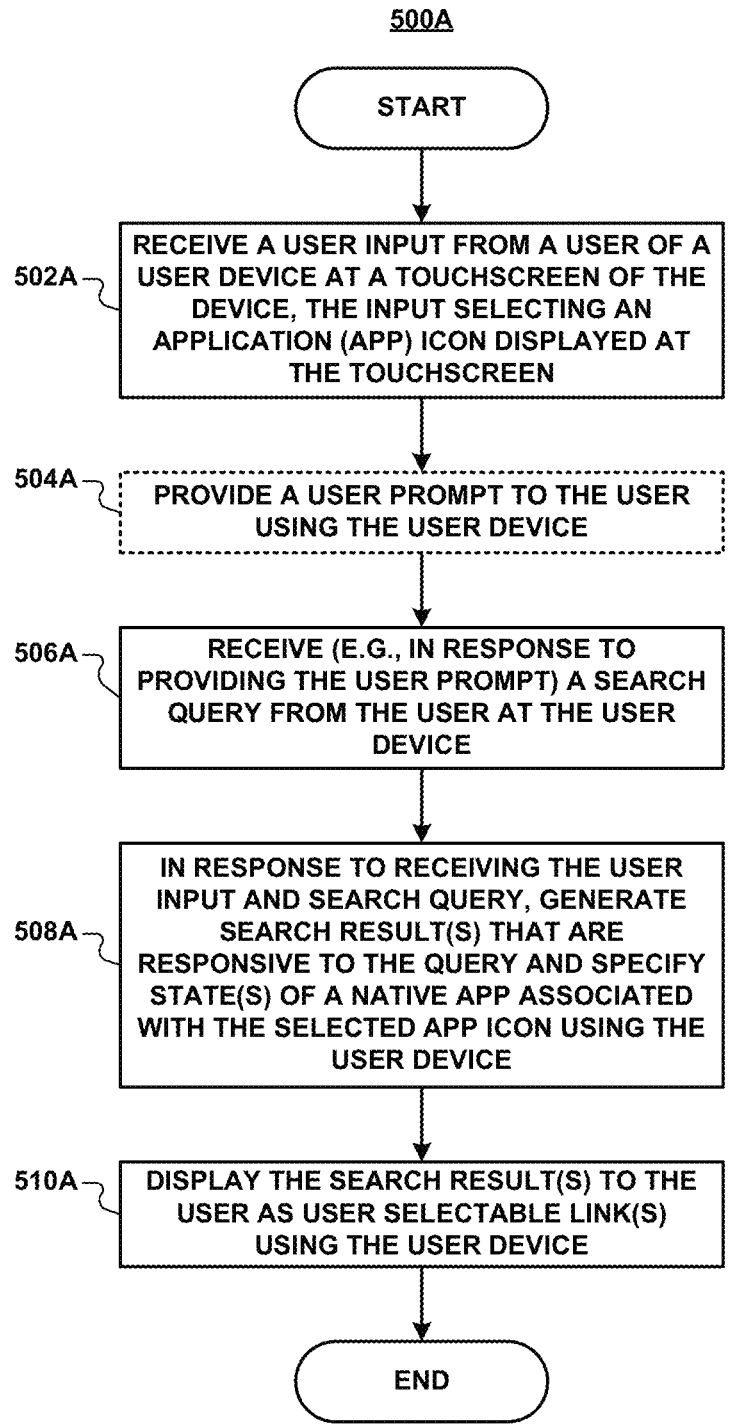
FIGS. 5A-5D are flow diagrams that illustrate example methods for generating search results at a user device based on a user input and a search query received from a user.

FIGS. 5A-5D are flow diagrams that illustrate example methods 500A-500D, respectively, for performing a search at a user device 100 based on a user input 228 and a search query 230 received from a user. With reference to FIG. 5A, in block 502A, a user device 100 may initially receive a user input 228 (e.g., a finger contact and/or pressure input) from a user of the device 100 at a touchscreen 102 of the device 100. As explained herein, the user input 228 may select an app icon displayed at the touchscreen 102. In block 504A, the user device 100 may optionally provide a user prompt (e.g., a visual, audible, and/or haptic output) to the user. In this example, the user prompt may be configured to cause the user to provide a search query 230 to the user device 100. In any case, in block 506A, e.g., in response to providing the user prompt, the user device 100 may receive the search query 230 from the user. For example, the user device 100 may receive the search query 230 from the user via voice or text input. In block 508A, in response to receiving the user input 228 and search query 230, the user device 100 may generate one or more search results 234 based on the query 230. In this example, each search result 234 is both responsive to the search query 230 and specifies a state of a native app associated with the app icon selected by the user input 228. As described herein, the user device 100 may generate the search results 234 internally (e.g., by performing a search within the native app using the search query 230), by querying an API associated with the app using the query 230 (e.g., using the app), or by transmitting the query 230 to the search system 104.

Figure 5B:
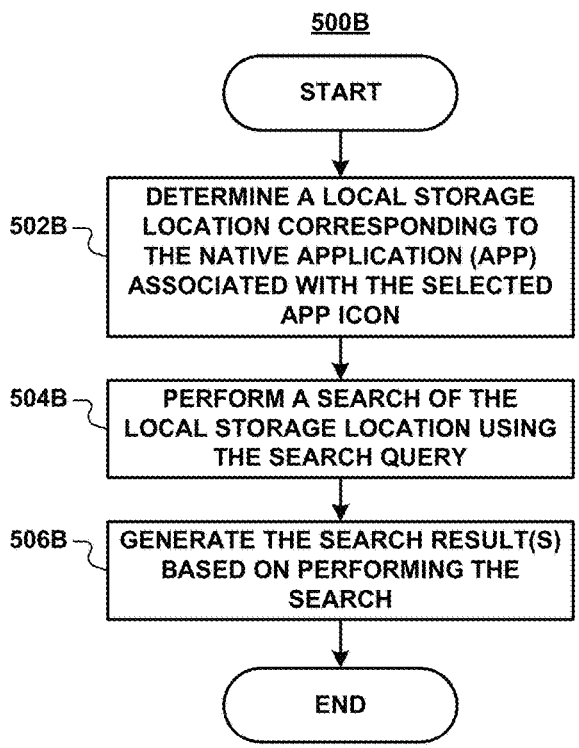
Figure 5C:
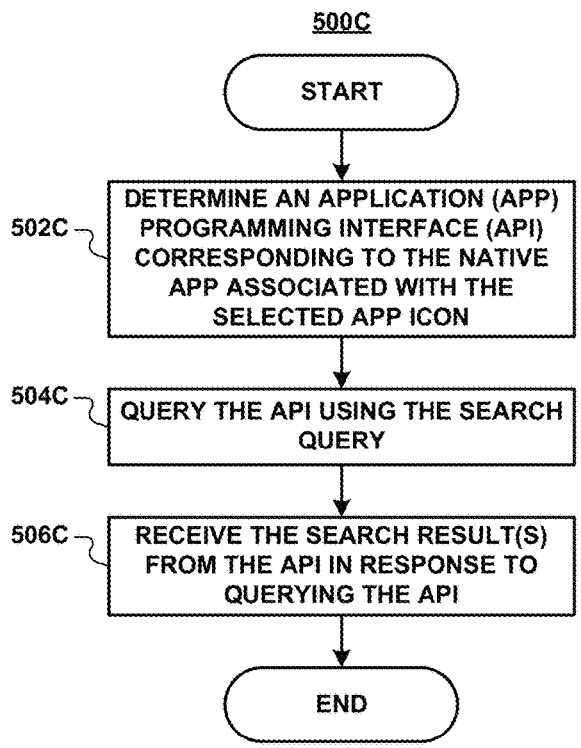
Figure 5D:
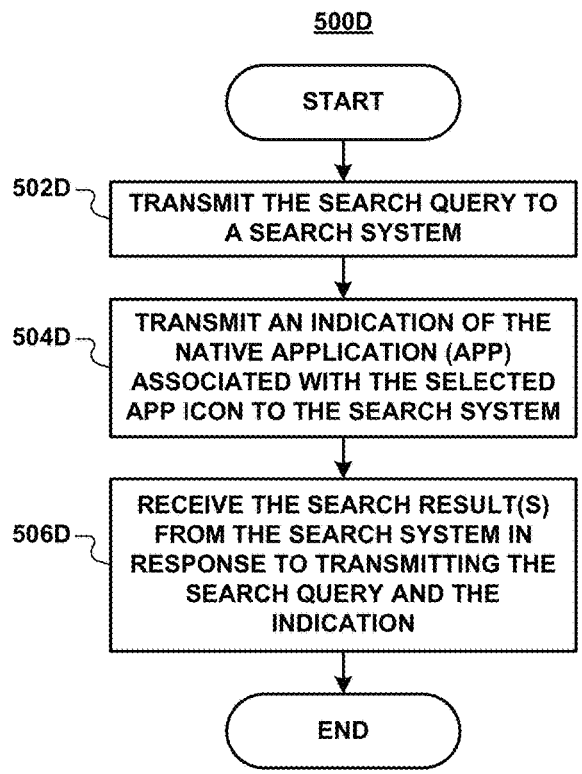

As one example, with reference to FIG. 5B, in block 502B, the user device 100 may determine (e.g., identify) a local storage location (e.g., memory space) included on the device 100. In this example, the local storage location corresponds to the native app associated with the app icon selected by the user input 228 (e.g., the app uses the location to store data used by the app). In block 504B, the user device 100 may perform a search of the local storage location using the search query 230 and, in block 506B, generate the search results 234 based on (e.g., as a result of) performing the search. As another example, with reference to FIG. 5C, in block 502C, the user device 100 may determine (e.g., identify) an API that corresponds to the native app associated with the selected app icon. For example, the API may refer to one or more remote servers and/or data stores used by the native app during the course of its operation. In block 504C, the user device 100 may query the API using the search query 230 and, in block 506C, receive the search results 234 from the API in response to querying the API. As still another example, with reference to FIG. 5D, in block 502D, the user device 100 may transmit the search query 230 to the search system 104. In block 504D, the user device 100 may further transmit an indication of the native app associated with the selected app icon to the search system 104. In block 506D, the user device 100 may receive the search results 234 from the search system 104 in response to transmitting the search query 230 and the indication.

In any case, in block 510A, the user device 100 displays the search results 234 to the user as one or more user selectable links. In some examples, the user device 100 may display the search results 234 as the user selectable links at the touchscreen 102 of the device 100 (e.g., within a GUI of the native app associated with the app icon selected by the user input 228). In other examples, the user device 100 may forward the search results 234 to be displayed as the user selectable links at another computing device other than the device 100.

Figure 5E:
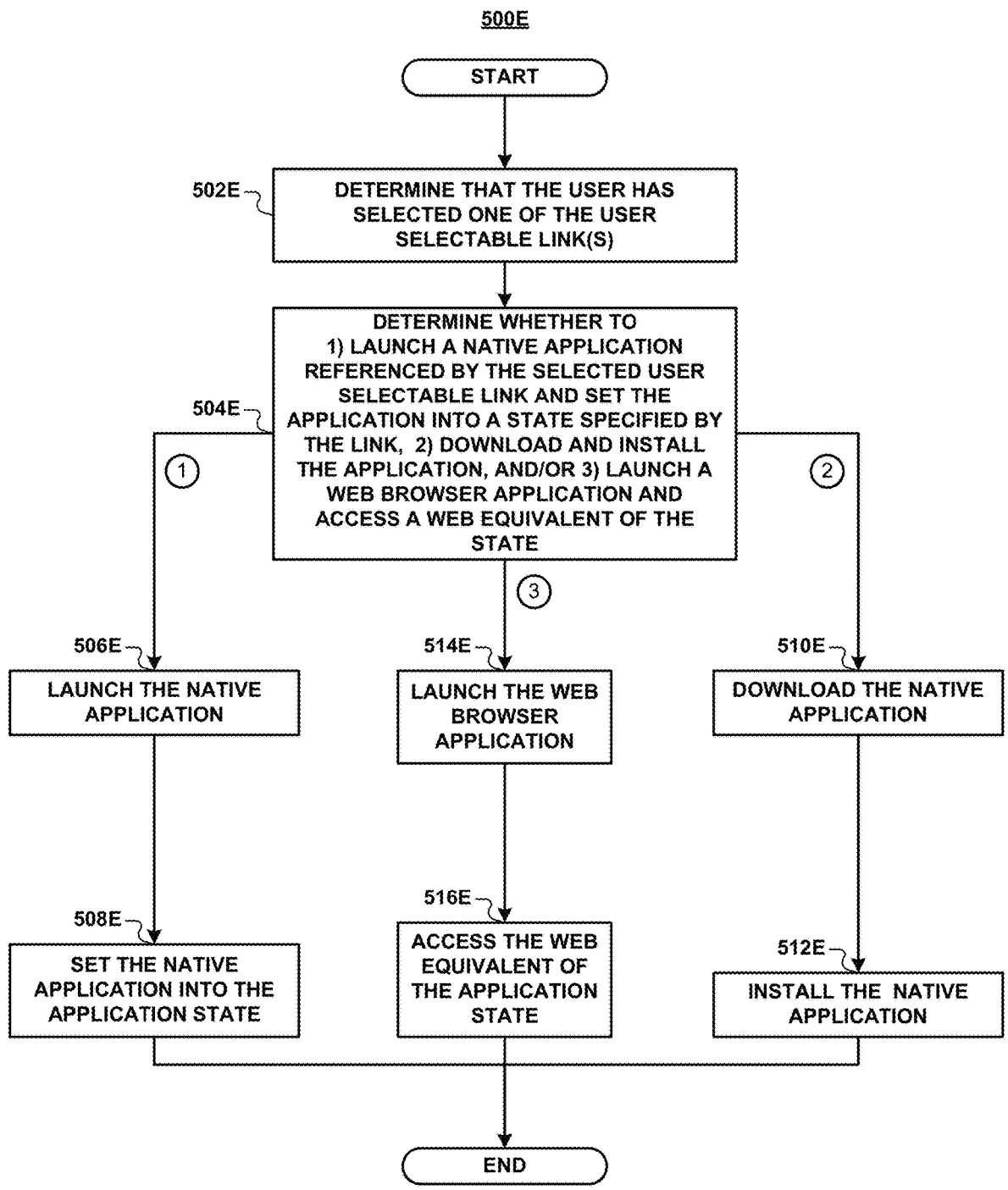
FIG. 5E is a flow diagram that illustrates an example method for performing one or more actions in response to a user selecting a search result on a user device.

FIG. 5E is a flow diagram that illustrates an example method 500E for performing one or more actions in response to a user selecting a search result 234 displayed on a user device 100. As shown in FIG. 5E, in block 502E, the user device 100 may initially determine (e.g., detect) that the user has selected one of the user selectable links displayed to the user as described above with reference to FIG. 5A. In block 504E, in response to detecting the user selection, the user device 100 may determine whether to perform one or more of the following actions. As one example, as shown in blocks 506E and 508E, the user device 100 may launch a native app referenced by the selected user selectable link (e.g., by an app access mechanism, or "AAM," included in the link) and set the app into a state specified by the link (e.g., by the AAM). (AAMs are discussed in further detail below). As another example, as shown in blocks 510E and 512E, the user device 100 may download the native app (e.g., from a digital distribution platform using an app download address ("ADA") also included in the selected user selectable link) and install the app. In this example, upon downloading and installing the native app, the user device 100 may launch the app and set the app into the state, in a similar manner as described above with reference to blocks 506E and 508E. As still another example, as shown in blocks 514E and 516E, the user device 100 may launch a web browser app 210 included on the device 100 and access a uniform resource locator ("URL") corresponding to a state of a web-based app (e.g., using a web access mechanism ("WAM") also included in the selected user selectable link). In this example, the state of the web-based app may be an equivalent of the state of the native app described above.

The user device 100 may determine whether to perform any combination of the above-described actions. As one example, in the event the native app referenced by the selected user selectable link is installed on the user device 100, the device 100 may launch the app and set the app into the state. As another example, in the event the native app is not installed on the user device 100, the device 100 may download and install the app (e.g., followed by launching and setting the app into the state). As still another example, in the event the user device 100 lacks sufficient storage space and/or communications network bandwidth to download and/or install the native app as described above, the device 100 may launch the web browser app 210 and access the URL corresponding to the web equivalent of the state.

Figure 6:
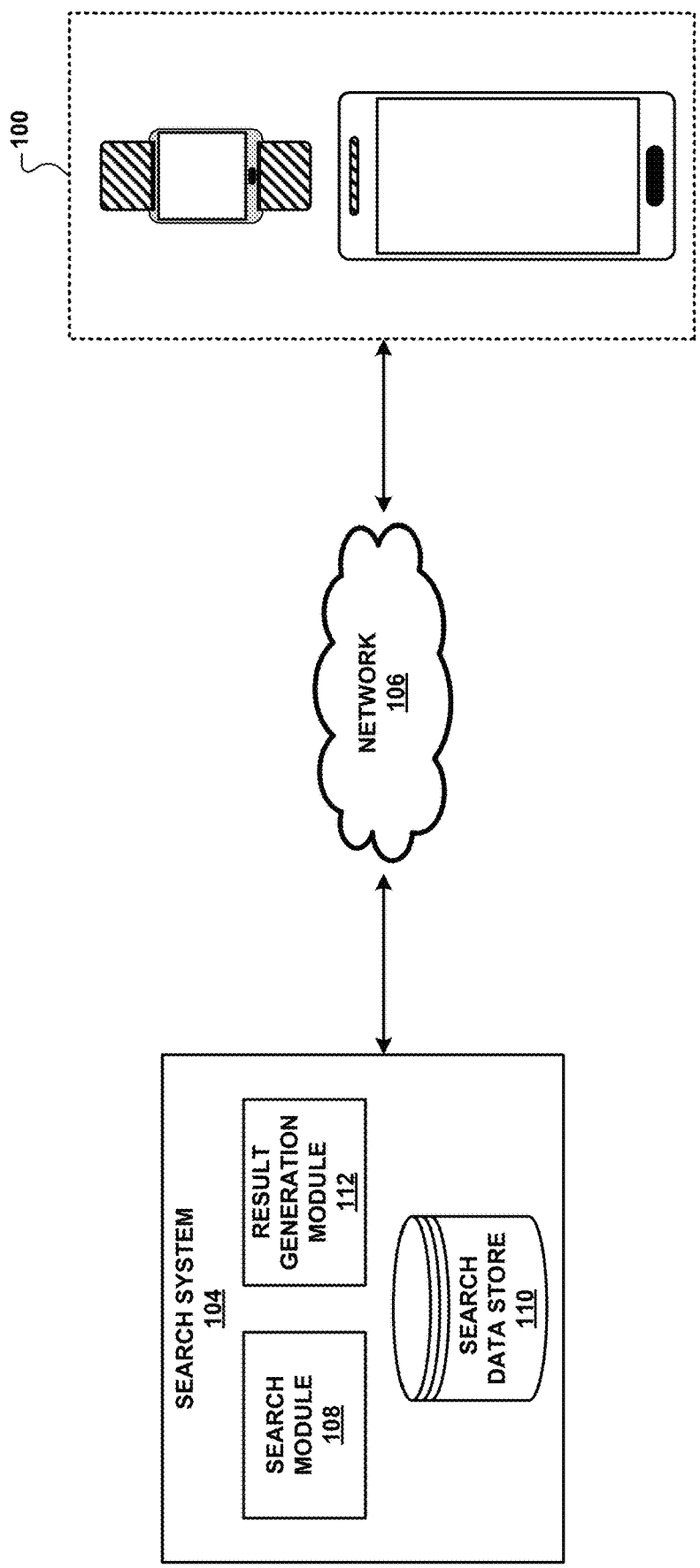
FIG. 6 illustrates an example environment that includes a user device and a search system that communicate via a network.

FIG. 6 is a functional block diagram illustrating an example environment that includes a user device 100 and a search system 104 that communicate via a network 106. The network 106 through which the user device 100 and search system 104 communicate may include any type of network, such as a local area network (LAN), a wide area network (WAN), and/or the Internet. As shown in FIG. 6, the search system 104 includes a search module 108, a search data store 110, and a result generation module 112, which are described below.

In the example of FIG. 6, the user device 100 receives a user input 228 (e.g., a finger contact and/or pressure input) from a user of the device 100 at a touchscreen 102 of the device 100, as described herein. In this example, the user input 228 selects an app icon displayed at the touchscreen 102. The user device 100 further receives a search query 230 from the user (e.g., via voice or text input), as also described herein. In some examples, to receive the search query 230, the user device 100 may provide a user prompt (e.g., a visual output, such as a GUI element, at the touchscreen 102; an audible output, such as a sound or a voice instruction, at a speaker element of the device 100; and/or a haptic output, such as a vibration, using a haptic driver of the device 100) to the user. In these examples, the user prompt may be configured to prompt the user to provide the search query 230 to the user device 100. In any case, in response to receiving the user input 228 and search query 230 from the user, the user device 100 generates one or more search results 234 based on the query 230. In this example, each search result 234 is both responsive to the search query 230 and specifies a state (e.g., a GUI, or screen) of a native app associated with the app icon selected by the user input 228. The user device 100 then displays the search results 234 to the user (e.g., as one or more user selectable links), as further described herein. For example, the user device 100 may display the search results 234 at the touchscreen 102 (e.g., within a GUI of the native app associated with the selected app icon). Alternatively, the user device 100 may forward the search results 234 for display at another computing device.

In the example of FIG. 6, to generate the search results 234, the user device 100 interacts with the search system 104. In particular, the user device 100 receives the search query 230 from the user (e.g., in response to providing the user prompt) and transmits the query 230 to the search system 104. In some examples, the user device 100 may also transmit an indication (e.g., a name) of the native app associated with the app icon selected by the user input 228 to the search system 104. The search system 104 receives the search query 230 (and, e.g., the indication) from the user device 100 and generates the search results 234 in response to receiving (e.g., based on) the query 230 (and, e.g., the indication). Specifically, the search system 104 generates the search results 234 based on the search query 230 (and, e.g., the indication) and using information included in one or more app state records stored in the search data store 110. In this example, each app state record may specify a state (e.g., a GUI, or screen) of a native app. For example, each app state record may include one or more access mechanisms ("AMs") that enable a user device 100 to access the state of the native app (and, e.g., a web equivalent thereof) specified by the record. The search system 104 transmits the AMs included in the app state records to the user device 100 as the search results 234, as described herein. Each app state record may also include app state information (ASI) (e.g., text) and other information (e.g., an app state name/ID and an indication of a native app associated with the state specified by the record), which the search system 104 may use to identify the record in the search data store 110, as also described herein. The search system 104 transmits the search results 234, including the AMs, to the user device 100. The user device 100 receives the search results 234 from the search system 104 and displays the results 234 to the user, e.g., as one or more user selectable links that include the AMs. In some examples, the user device 100 forwards the search results 234 for display as the user selectable links to another computing device.

In this disclosure, an application or app may refer to computer software that causes a computing device (e.g., the user device 100) to perform a task. In some examples, an app may be referred to as a "program." Example apps include word processing apps, spreadsheet apps, messaging apps, media streaming apps, social networking apps, and games. Apps can be executed on a variety of different computing devices, including mobile computing devices, such as smartphones, tablets, and wearable computing devices (e.g., headsets and/or watches). Apps can also be executed on other types of computing devices having other form factors, such as laptop or desktop computers, or other consumer electronic devices. In some examples, apps may be installed on a computing device prior to a user purchasing the device. In other examples, the user may download and install apps on the computing device after purchasing the device. A native app, as used herein, may refer to an app that is installed and executed on a user device 100. A web-based app, in turn, may refer to an app that is accessible from a user device 100 via a web browser app 210.

An AM, as used herein, may include any of a native app AM ("app AM," or "AAM"), a web AM ("WAM"), and an app download address ("ADA"). As such, the user device 100 of the present disclosure may use an AM to access the functionality provided by a native or a web-based app. For example, a user of the user device 100 may select a user selectable link that includes the AM to access the functionality of the native or web-based app.

An AAM may be a string that references a native app and indicates one or more operations for a user device 100 (e.g., the app) to perform. If a user of the user device 100 selects a user selectable link that includes the AAM, the device 100 may launch the native app referenced by the AAM and (e.g., cause the app to) perform the operations indicated by the AAM. In other words, the user selecting the user selectable link may cause the user device 100 to launch the native app and set the app into a state (e.g., in which the app displays a GUI, or screen) corresponding to the operations. The state of the native app may be referred to as an "app state." As a result, the native app may be configured to display one or more products, services, or vendors, to the user, e.g., via a display (e.g., a touchscreen 102) of the user device 100. In this manner, the AAM may specify the state of the native app. The state, in turn, may refer to the operations indicated by the AAM and/or the outcome of the native app performing the operations in response to the user selecting the user selectable link including the AAM.

A WAM may include a resource identifier that references a web resource (e.g., a page of a web-based app, or website). For example, the WAM may include a uniform resource locator (URL) (i.e., a web address) used with the hypertext transfer protocol (HTTP). If a user of a user device 100 selects a user selectable link that includes the WAM, the device 100 may launch a web browser app 210 included on the device 100 and retrieve the web resource referenced by the resource identifier. Stated another way, if the user selects the user selectable link, the user device 100 may launch the web browser app 210 and access a state (e.g., a page) of a web-based app, or website, specified by the WAM. In some examples, a WAM included in an app state record along with an AAM may specify a state of a web-based app that is equivalent (e.g., analogous) to a state of a native app specified by the AAM.

An ADA may specify a location (e.g., a digital distribution platform, such as the Play Store® developed by Google Inc.) where a native app (e.g., a native app referenced by an AAM) may be downloaded. In some examples, an app state record may include an ADA along with an AAM (and, e.g., a WAM). In these examples, the ADA may specify a location (e.g., a digital distribution platform) from which a native app referenced by the AAM may be downloaded.

In some examples, the search system 104 may transmit the search results 234, including the AMs, to the user device 100 with additional data. For example, the search system 104 may transmit link (e.g., text and/or image) data that the user device 100 may use to generate the user selectable links for the AMs included in the search results 234. As a result, each user selectable link may include text and/or image data that the user of the user device 100 may select (e.g., touch, or "click on"). Each user selectable link may also be associated with the corresponding one or more of the AMs included in the search results 234, such that when the user selects the link, the user device 100 launches a native or web-based app referenced by the AMs and causes the app to perform one or more operations indicated by the AMs. In some examples, the text and/or image data included in each user selectable link may indicate the operations performed by the corresponding native or web-based app upon selection of the link.

Figure 9B:
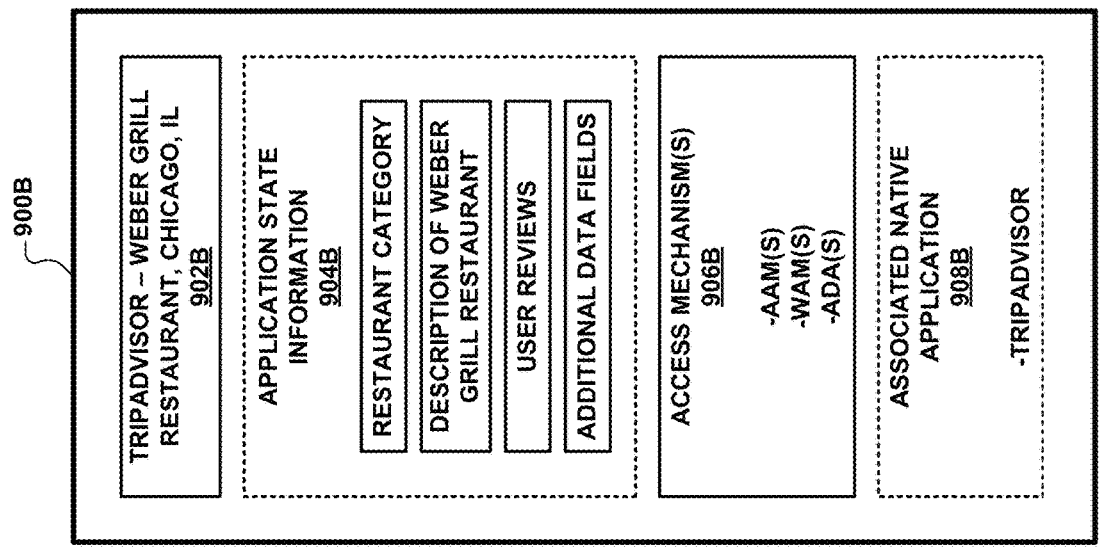
FIGS. 9A-9B illustrate example application state records of a search data store.
Figure 9A:
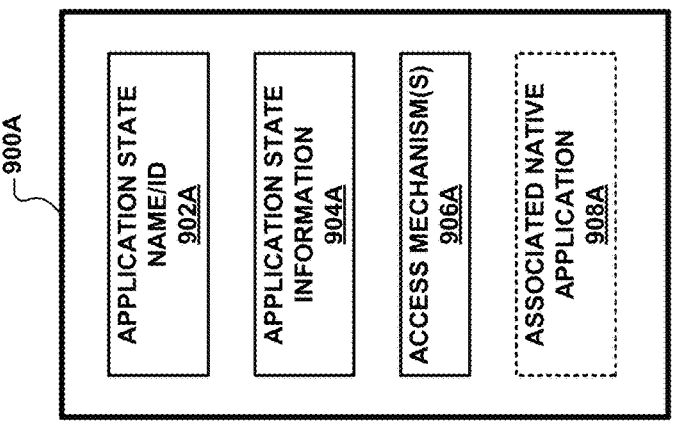

As described herein, the search system 104 uses data (e.g., app state records) included in the search data store 110 to generate search results 234 based on search queries 230 (and, e.g., indications of native apps associated with app icons selected by user inputs 228) received from the user device 100. The search data store 110 may include one or more databases, indices (e.g., inverted indices), tables, files, or other data structures that may be used to implement the techniques of the present disclosure. In some examples, the search data store 110 may be included in one or more storage devices. The search data store 110 includes one or more app state records (e.g., as shown in FIG. 9A). Each app state record may include data related to a function of a native app and/or a state of the app resulting from the app performing the function. For example, each app state record may include, among other content, an app state name/ID, ASI, and one or more AMs. The app state name/ID may uniquely identify the app state record among other app state records included in the search data store 110. The ASI may describe a state into which a native app is set according to one or more AMs included in the app state record. The AM (e.g., an AAM, or a WAM) may include data (e.g., a text/number string) that causes a user device 100 to launch a native or web-based app and perform a function associated with the app. In some examples, the AM may include data (e.g., an ADA) that enables a user device 100 to download and install (e.g., from a digital distribution platform) a native app on a user device 100. Example app state records are shown in FIGS. 9A and 9B.

As described above, the search system 104 receives the search query 230 (and, e.g., the indication of the native app associated with the app icon selected by the user input 228) from the user device 100, generates the search results 234 based on the query 230 (and, e.g., the indication), and transmits the results 234 to the device 100. The search query 230 may include text, numbers, and/or symbols (e.g., punctuation) entered into the user device 100 by the user via voice and/or text input. In some examples, the user device 100 may receive the search query 230 from the user and/or transmit the query 230 to the search system 104 using the search app 214 included (e.g., running in the background on) the device 100. For example, the search app 214 may receive the search query 230 from the user using any of voice recognition software included on the user device 100, a virtual keyboard displayed at the touchscreen 102, and a dedicated mechanical keypad of the device 100, and then transmit the query 230 to the search system 104.

In other examples, the user device 100 may further generate the indication of the native app associated with the selected app icon and/or transmit the indication to the search system 104 using the search app 214. The indication may include any of text, numbers, and/or symbols (e.g., punctuation), as well as any machine-readable (e.g., binary) data used by the user device 100 (e.g., the search app 214) to represent the native app associated with the selected app icon. In some examples, the search app 214 may transmit the indication to the search system 104 along with the search query 230. In other examples, the search app 214 may also receive the search results 234 from the search system 104 and/or display the results 234 to the user on the device 100 as user selectable links. The search app 214 may be a native app dedicated to search, or a more general app, such as the web browser app 210 also included on the user device 100.

In some examples, the user device 100 may transmit additional data to the search system 104 along with the search query 230. The search query 230 and the additional data may be referred to herein as a query wrapper. The additional data may include geo-location data associated with the user device 100, platform data for the device 100 (e.g., a type and/or a version of the device 100, an OS, and/or the web browser app 210 of the device 100), an identity of the user (e.g., a username), partner specific data, and other data. The user device 100 may transmit the query wrapper to the search system 104. The search system 104 may use the search query 230 and/or the additional data included in the query wrapper to generate the search results 234 and transmit the results 234 to the user device 100.

As described herein, to generate the search results 234, the search module 108 may identify one or more app state records included in the search data store 110 based on the search query 230 and, e.g., the indication of the native app associated with the selected app icon. Initially, the search module 108 may analyze the search query 230. The search module 108 may then identify one or more app state records included in the search data store 110 based on the (e.g., analyzed) search query 230. In some examples, the search module 108 may further identify the app state records based on the indication. For example, the search module 108 may identify the app state records based on (e.g., text) matches between terms of the search query 230 (and, e.g., the indication) and terms of information included in the records. The search module 108 may then process (e.g., score) the identified app state records. For example, the search module 108 may determine how well the identified app state records match the search query 230 (and, e.g., the indication). The search module 108 may then select one or more of the identified app state records that best match the search query 230 (and, e.g., the indication). The search module 108 may transmit one or more app state IDs associated with the selected app state records to the result generation module 112. The result generation module 112 may identify the app state records selected by the search module 108 in the search data store 110 using the received app state IDs. The result generation module 112 may then select one or more AMs from the identified app state records. The result generation module 112 may transmit the selected AMs to the user device 100 as the search results 234.

In some examples, the result generation module 112 may transmit additional information along with the AMs to the user device 100. For example, as described herein, a set processing module 806 of the search module 108 may generate result scores for the app state records from which the AMs are selected (e.g., using values of metrics associated with persons, places, or things described in the records and/or various features of the search query 230). As such, the one or more AMs selected from each app state record may be associated with a result score that indicates a rank of the AMs relative to AMs selected from other app state records. In these examples, the result generation module 112 may transmit the result scores associated with the AMs to the user device 100 along with the AMs. In additional examples, the result generation module 112 may also transmit link (e.g., text and/or image) data associated with the AMs to the user device 100 to be used to display the AMs to a user, as also described herein.

The search system 104 may use various sources of data to generate and/or update the search data store 110. For example, the search system 104 may use the data sources to generate and/or update one or more databases, indices, tables, files, or other data structures included in the search data store 110. For instance, the search system 104 may generate new app state records and/or update existing app state records using data retrieved from the data sources. Although not shown, in some examples, the search system 104 may include one or more modules configured to generate the new app state records and/or update the existing app state records. In some examples, some or all of the data included in the search data store 110 (e.g., one or more app state records) may be manually generated by a human operator.

The data sources may include a variety of different data providers. For example, the data sources may include data from app developers, such as app developer websites and data feeds provided by app developers. The data sources may also include operators of digital distribution platforms configured to distribute apps to user devices 100. The data sources may further include other websites, such as websites that include web logs (i.e., blogs), app reviews, and/or other data related to apps. Additionally, the data sources may include social networking sites, such as "FACEBOOK®" by Facebook, Inc. (e.g., Facebook posts) and "TWITTER®" by Twitter, Inc. (e.g., text from tweets). The data sources may also include online databases that include data related to movies, television programs, music, and restaurants. The data sources may further include other resources, which may have various types of content and update rates.

In some examples, the search system 104 may retrieve data from the data sources, including any type of data related to native app functionality and/or states. The search system 104 may then generate one or more app state records based on the data and store the records in the search data store 110. In other examples, some or all of the data included in the app state records (e.g., ASI) may be manually generated by a human operator. In further examples, the data included in the app state records may be updated over time so that the search system 104 provides up-to-date search results 234 in response to user-specified search queries 230 (and, e.g., indications of native apps associated with selected app icons) received from the user device 100.

Figure 7:
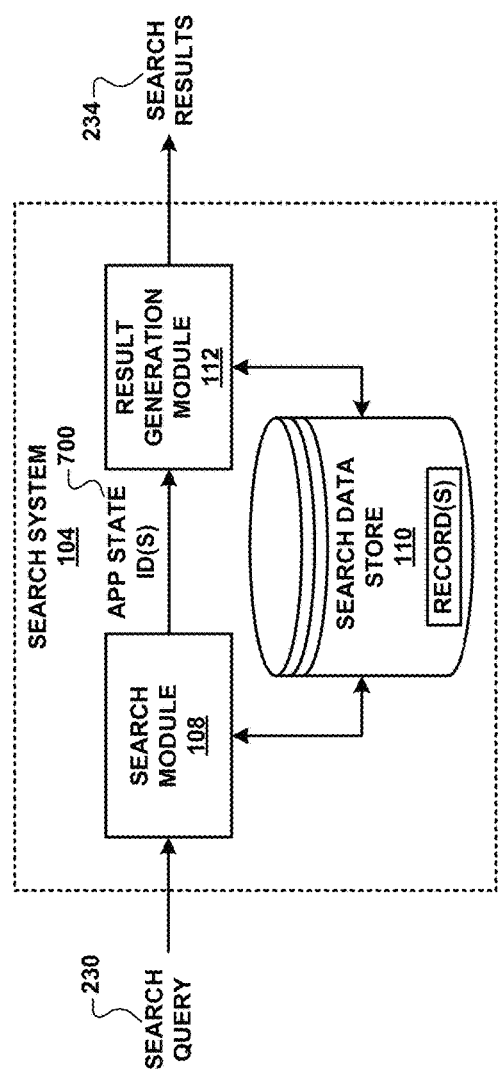
FIG. 7 is a functional block diagram of an example search system.

FIG. 7 shows an example search system 104. As described herein, the search system 104 generates search results 234 based on a search query 230 (and, e.g., an indication of a native app associated with an app icon selected by a user input 228) received from the user device 100 and using data included in the search data store 110. Specifically, the search module 108 identifies one or more app state records included in the search data store 110 based on the search query 230 (and, e.g., based on the indication). The search module 108 then transmits one or more app state IDs 700 that identify the identified app state records to the result generation module 112. The result generation module 112 receives the app state IDs 700 from the search module 108, identifies the app state records in the search data store 110 using the IDs 700, and selects one or more AMs from the identified records. The result generation module 112 then transmits the selected AMs to the user device 100 as the search results 234 (e.g., along with result scores, link data, and/or other information).

Figure 8:
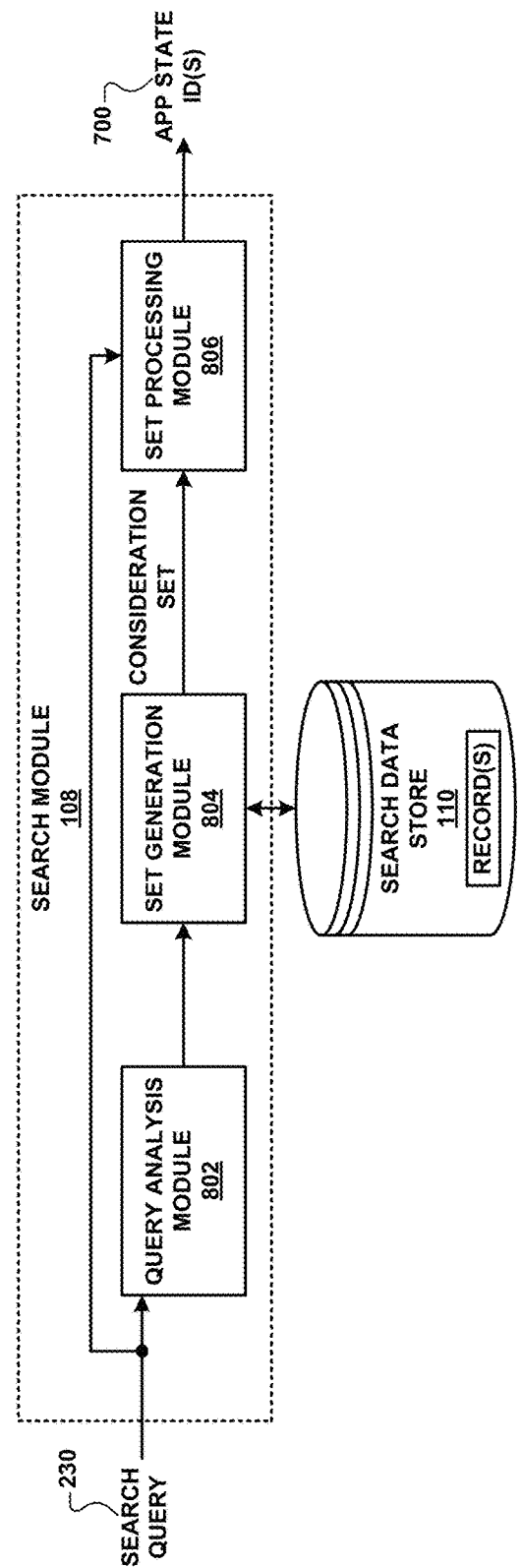
FIG. 8 is a functional block diagram of an example search module.

FIG. 8 shows an example search module 108 and an example search data store 110. The search module 108 of FIG. 8 includes a query analysis module 802, a consideration set generation module (hereinafter, "set generation module") 804, and a consideration set processing module (hereinafter, "set processing module") 806. The query analysis module 802 receives a search query 230 from the user device 100 (e.g., as part of a query wrapper) and analyzes the query 230 (e.g., performs any of tokenization, filtering, stemming, synonymization, and stop word removal with respect to the query 230). The set generation module 804 identifies one or more app state records included in the search data store 110 based on the (e.g., analyzed) search query 230. In some examples, the set generation module 804 may further identify the app state records based on an indication of a native app associated with an app icon that has been selected by a user input 228 on the user device 100, which may also be received from the device 100 as described herein. As a specific example, the set generation module 804 may identify the app state records using the search query 230 and, e.g., the indication, as one or more inputs to Lucene® information retrieval software developed by the Apache Software Foundation. The set generation module 804 may identify the app state records based on one or more (e.g., text) matches between one or more terms of the search query 230 and, e.g., the indication, and one or more terms of information (e.g., app state names/IDs and/or ASI) included in the records. The identified app state records may be referred to herein as a "consideration set." The set processing module 806 may process (e.g., score and select a subset of) the consideration set to generate one or more app state IDs 700 that identify some or all of the app state records, and transmit the IDs 700 to the result generation module 112, as described above.

The information conveyed by the search results 234 may depend on the manner in which the set processing module 806 generates the result scores for the identified app state records. For example, for each identified app state record, the corresponding result score may indicate relevance of the state of the native app specified by the record to the search query 230, popularity of the state, and/or other properties of the state, depending on the one or more parameters the set processing module 806 uses to score the record. The set processing module 806 may generate the result scores for the app state records in a variety of different ways. In some examples, the set processing module 806 generates a result score for an app state record based on one or more scoring features. The scoring features may be associated with the app state record and/or the search query 230. A record scoring feature may be based on any data associated with an app state record. For example, a record scoring feature may be based on any data included in ASI of an app state record. Example record scoring features may be a quality score, or whether an app state record includes an AAM that specifies a default state (e.g., a main page), or a deeper state, of a native app. A query scoring feature may include any data associated with the search query 230. For example, a query scoring feature may include a number of words in the search query 230, popularity of the query 230, and/or an expected frequency of the words in the query 230. A record-query scoring feature may include any data generated based on information associated with both an app state record and the search query 230 that resulted in identification of the record by the set generation module 804. For example, record-query scoring features may include parameters that indicate how well terms of the search query 230 match terms of ASI of an identified app state record. In additional examples, the set processing module 806 may generate a result score for an app state record based on the indication of the native app associated with the app icon that has been selected by a user input 228 on the user device 100. For example, the set processing module 806 may use a scoring feature that includes parameters that indicate how well (e.g., terms of) the indication match (e.g., terms of) information included in the app state record (e.g., an indication of a native app that is associated with the state specified by the record). In general, the set processing module 806 may generate a result score for an app state record based on any combination of a record scoring feature, a query scoring feature, a record-query scoring feature, a scoring feature related to the indication, and/or any additional scoring feature not explicitly listed.

In some examples, the set processing module 806 may include one or more machine-learned models (e.g., a supervised learning model) configured to receive one or more scoring features. The machine-learned models may generate one or more result scores for one or more app state records based on at least one of the record, query, record-query, and indication-based scoring features described above. For example, the set processing module 806 may pair the search query 230 with each app state record and calculate a vector of features for each (query, record) pair. The vector of features may include one or more record, query, record-query, and indication-based scoring features, as described herein. The set processing module 806 may then input the vector of features into a machine-learned regression model to calculate a result score for the app state record. In some examples, the machine-learned regression model may include a set of decision trees (e.g., gradient-boosted decision trees), or may be trained by a simple form of logistic regression. In other examples, the machine-learned task described above can be framed as a semi-supervised learning task, where a minority of the training data is labeled with human curated result scores and the rest of the data is used without such labels.

As described herein, the result scores associated with the app state records (e.g., the AMs included therein) may be used in a variety of different ways. In some examples, the result scores may be used to rank (e.g., order) the corresponding AMs within a list. In these examples, a higher result score may indicate that a corresponding AM is more relevant to the user (e.g., to the search query 230) than an AM having a smaller result score. In examples where the search results 234 are displayed to the user on the user device 100 or another computing device as a list of one or more user selectable links, links including AMs associated with larger result scores may be listed closer to the top of the list (e.g., near the top of the screen). In these examples, links including AMs having lower result scores may be located farther down the list (e.g., off screen) and may be accessed by scrolling down the screen of the user device 100 or other device.

FIG. 9A depicts an example app state record 900A that may be included in the search data store 110. The app state record 900A of FIG. 9A includes information related to (e.g., specifying) a state of a native app. As shown in FIG. 9A, the app state record 900A includes an app state name/ID 902A that uniquely identifies the record 900A among other app state records included in the search data store 110. As further shown, the app state record 900A includes ASI (e.g., text) 904A that describes the state specified by the record 900A. As also shown, the app state record 900A includes one or more AMs (e.g., AAMs, WAMs, and/or ADAs) 906A that enable a user device 100 to access the state specified by the record 900A. As shown in FIG. 9A, in some examples, the app state record 900A may also include an indication (e.g., a name) 908A of the native app associated with the state specified by the record 900A. In other examples, the app state name/ID 902A, ASI 904A, and/or AMs 906A included in the app state record 900A may indicate (e.g., reference) the associated native app.

In some examples, the app state record 900A of FIG. 9A may also include information that describes values of one or more metrics associated with a person, place, or thing described in the record 900A. Examples of the metrics include popularity of the place described in the app state record 900A and/or ratings (e.g., user ratings) of the place. For example, if the app state record 900A describes a song, a metric associated with the song may be based on popularity of the song and/or ratings (e.g., user ratings) of the song. The information included in the app state record 900A may also be based on measurements associated with the record 900A, such as how often the record 900A is retrieved during a search and how often user selectable links for the AMs 906A of the record 900A are selected by a user. The information included in the app state record 900A may also indicate whether the record 900A includes an AAM for a default state, or a deeper state, of the native app associated with the record 900A.

FIG. 9B illustrates a specific example of an app state record 900B that specifies a state of TripAdvisor. The state specified by the app state record 900B corresponds to an entry in TripAdvisor for the restaurant "Weber Grill" located in Chicago, Ill. As shown in FIG. 9B, the app state record 900B includes an app state name/ID "TripAdvisor—Weber Grill Restaurant, Chicago, Ill." 902B that uniquely identifies the record 900B among other app state records included in the search data store 110. In other examples, the app state name/ID 902B may be a numeric value, or have another (e.g., machine-readable) representation. As further shown, the app state record 900B also includes ASI 904B that describes the state specified by the record 900B, and which may be used to identify the record 900B within the search data store 110. For example, as described herein, the search system 104 may identify the app state record 900B within the search data store 110 based on (e.g., text) matches between terms of a search query 230 received from the user device 100 and terms of the ASI 904B. In this example, the ASI 904B describes a restaurant category, a description, user reviews, and/or any other information related to the restaurant associated with the state specified by the app state record 900B. In some examples, the ASI 904B may also describe one or more functions provided by the state, such as, e.g., "make a restaurant reservation," "read user reviews," and "write a user review." As also shown, the app state record 900B further includes one or more AMs (e.g., AAMs, WAMs, and/or ADAs) 906B that enable a user device 100 to access the state specified by the record 900B.

In the example of FIG. 9B, the app state record 900B also includes an indication 908B of the native app (i.e., TripAdvisor) associated with the state specified by the record 900B, which may also be used to identify the record 900B within the search data store 110. For instance, as described herein, the search system 104 may receive an indication of a native app associated with an app icon that has been selected by a user input 228 from the user device 100. In some examples, the search system 104 may identify the app state record 900B based on (e.g., text) matches between the received indication and the indication 908B included in the record 900B. In other examples, the app state record 900B may not explicitly (e.g., separately) indicate the native app associated with the state specified by the record 900B (e.g., the record 900B may not include the indication 908B). In these examples, the search system 104 may identify the app state record 900B based on (e.g., text) matches between the received indication and any of the app state name/ID 902B, ASI 904B, and/or AMs 906B that may reference the native app.

Figure 10:
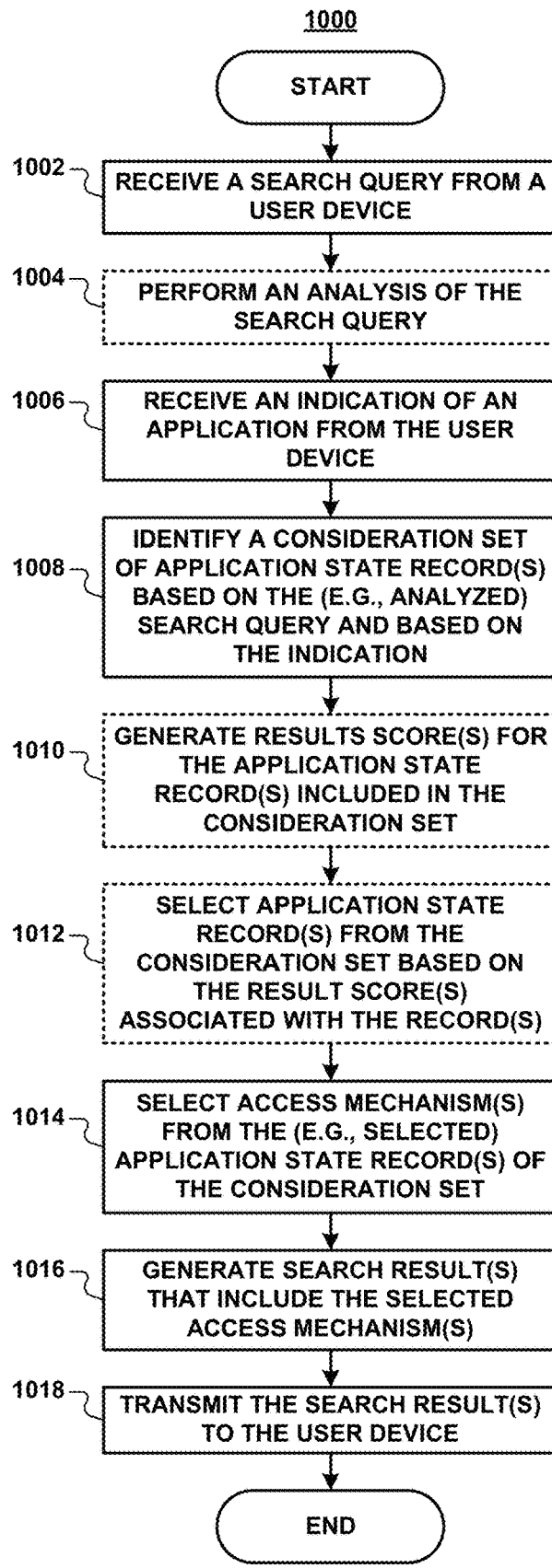
FIG. 10 is a flow diagram that illustrates an example method for performing a search for application state records based on a search query received from a user device.

FIG. 10 is a flow diagram that illustrates an example method 1000 for performing a search for app state records 900A included in the search data store 110 using a search query 230 and, e.g., an indication of a native app, received from a user device 100. As shown in FIG. 10, in block 1002, the search system 104 may initially receive a search query 230 specified by a user from a user device 100 (e.g., as part of a query wrapper). As described herein, the user device 100 may receive the search query 230 from the user (e.g., via voice or text input) and transmit the query 230 to the search system 104. In block 1004, the search system 104 (e.g., the query analysis module 802) may optionally perform an analysis of the search query 230 (e.g., perform any of tokenization, filtering, stemming, synonym ization, and stop word removal with respect to the query 230). In some examples, the search system 104 may also receive other information from the user device 100 (e.g., as part of the query wrapper, or separately), such as information associated with the user and/or geo-location, platform, and IP address information associated with the device 100. As one example, in block 1006, the search system 104 may receive an indication of a native app associated with an app icon that has been selected by a user input 228 on the user device 100 from the device 100, as also described herein.

In block 1008, the search system 104 (e.g., the set generation module 804) may identify a consideration set of one or more app state records 900A included in the search data store 110 based on the (e.g., analyzed) search query 230 and, e.g., the indication of the native app, received from the user device 100. As described herein, each of the identified app state records 900A may specify a state of a native app. As also described herein, the search system 104 may identify the app state records 900A based on matches between the search query 230 and, e.g., the indication, and information (e.g., app state names/IDs 902A, ASI 904A, AMs 906A, and/or indications 908A of associated native apps) included in the records 900A.

In blocks 1010-1012, the search system 104 (e.g., the set processing module 806) may optionally process the consideration set of the app state records 900A. Specifically, in block 1010, the search system 104 may generate one or more result scores for the app state records 900A included in the consideration set. For example, the search system 104 may generate a result score for each of the app state records 900A. Subsequently, in block 1012, the search system 104 may select one or more (e.g., a subset of the) app state records 900A from the consideration set based on the one or more result scores associated with the selected records 900A. For example, the search system 104 may select one or more app state records 900A included in the consideration set having the highest (e.g., largest) one or more result scores.

In any case, in block 1014, the search system 104 (e.g., the result generation module 112) may select one or more AMs from the (e.g., selected) app state records 900A of the consideration set. For example, the search system 104 may select one or more AAMs, ADAs, and/or WAMs from each (e.g., selected) app state record 900A. In some examples, the search system 104 may also select other information from the (e.g., selected) app state records 900A, such as result scores and/or link data associated with the records 900A. In block 1016, the search system 104 (e.g., the result generation module 112) may generate one or more search results 234 that include the selected AMs. For example, the search system 104 may generate the search results 234 such that each result 234 includes one or more of the AMs selected from the (e.g., selected) app state records 900A of the consideration set. Lastly, in block 1018, the search system 104 (e.g., the result generation module 112) may transmit the search results 234, including the selected AMs and any other information, to the user device 100 that provided the search query 230 and, e.g., the indication of the native app, to the system 104.

The modules and data stores included in the user device 100 and search system 104 represent features that may be included in these devices and systems as they are described in the present disclosure. For example, the processing unit(s) 200, memory component(s) 202, I/O component(s) 204, interconnect component(s) 206, and the various contents thereof may represent features included in the user device 100. Similarly, the search module 108, search data store 110, result generation module 112, and the various contents thereof may represent features included in the search system 104. The modules and data stores described herein may be embodied by electronic hardware, software, firmware, and/or any combination thereof. Depiction of different features as separate modules and data stores does not necessarily imply whether the modules and data stores are embodied by common or separate electronic hardware, software, and/or firmware components. As such, in some implementations, the features associated with the one or more modules and data stores depicted herein may be realized by common or separate electronic hardware, software, and/or firmware components.

The modules and data stores may be embodied by electronic hardware, software, and/or firmware components, including one or more processing units, memory components, I/O components, and interconnect components. The interconnect components may be configured to provide communication between the processing units, memory components, and/or I/O components, including the transceivers. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDDs), solid state drives (SSDs), magnetic tape drives, optical storage technology (e.g., compact disc, digital versatile disc, and/or Blu-ray disc), or any other memory components.

The memory components may include (e.g., store) the data described herein. For example, the memory components may include the data included in the record(s) 900A of the search data store 110 and/or other data. The memory components may also include instructions that may be executed by the processing units. For example, the memory components may include computer-readable instructions that, when executed by the processing units, cause the units to perform the various functions attributed to the modules and data stores described herein.

The I/O components may refer to electronic hardware, software, and/or firmware providing communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including (e.g., touch-screen-enabled) display screens, keyboards, pointer devices (e.g., a mouse), (e.g., capacitive, resistive, and/or other) touchscreens, speakers, and microphones. In some examples, the I/O components may include hardware, software, and/or firmware configured to communicate with additional devices, such as external memory (e.g., external HDDs).

In some implementations, the user device 100 and/or search system 104 may be a system of one or more computing devices (e.g., a computer search system) configured to implement the techniques described herein. Put another way, the features attributed to the modules and data stores described herein may be implemented by one or more computing devices. Each computing device may include any combination of electronic hardware, software, and/or firmware described above. For example, each computing device may include any combination of the processing units, memory components, I/O components, and interconnect components described above. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the user device 100 and/or search system 104 may be configured to communicate with the network 106. The computing devices may also be configured to communicate with one another via a computer network. In some examples, the computing devices of the search system 104 may include one or more server computing devices configured to communicate with the user device 100 (e.g., receive search queries 230 and transmit search results 234), gather data from data sources, index the data, store the data, and store other documents or media. In some examples, the computing devices may reside within one or more machines at a single geographic location. In other examples, the computing devices may be distributed across a number of geographic locations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean at least one of A, at least one of B, and at least one of C."

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112 (f) unless an element is expressly recited using the phrase "means for" or, in the case of a method claim, using the phrases "operation for" or "step for."

The invention claimed is:

1. A method for improving searching performance for a user device, the method comprising:
   receiving, at a touchscreen of the user device, a user input selecting an application and receiving, at the user device, a search query;
   in response to receiving the user input and the search query, searching content of a specific app stored in a memory of the user device based on the user input and the search query without opening the specific app, wherein the specific app corresponds to the application selected by the user input and the specific app is executable on the user device;
   generating, by at least one processor of the user device, search results based on the searched content of the specific app, each of the search results being a user selectable link to a different state of the specific app;
   displaying, on the touchscreen of the user device, the search results;
   receiving, at the touchscreen of the user device, another user input selecting one of the search results; and
   displaying a screen associated with a state of the specific app corresponding to the selected search result.

2. The method of claim 1, wherein the user input comprises at least one of a finger contact input or a pressure input with respect to the touchscreen.

3. The method of claim 1, wherein the user input comprises a momentary user input having a duration shorter than a predetermined threshold duration.

4. The method of claim 1, wherein the user input comprises a user input comprising a predetermined gesture having a duration longer than a predetermined threshold duration.

5. The method of claim 1, wherein the user input comprises a predetermined user gesture with respect to the touchscreen.

6. The method of claim 1, wherein the receiving of the user input and the search query comprises receiving the search query after receiving the user input.

7. The method of claim 1, wherein the receiving of the search query comprises receiving the search query via voice input.

8. The method of claim 1, wherein the receiving of the search query comprises receiving the search query via text input.

9. The method of claim 1, wherein the receiving of the search query comprises:
   providing, using the user device, a user prompt; and
   receiving the search query as a response to the user prompt.

10. The method of claim 9, wherein the providing of the user prompt comprises providing one or more of:
    a visual output at the touchscreen;
    a sound output;
    a voice command output; or
    a vibration output.

11. The method of claim 1, wherein the generating of the search results comprises:
    determining, by the at least one processor, a storage location included on the user device and corresponding to the specific app;
    performing, by the at least one processor, a search of the storage location using the search query; and
    generating, by the at least one processor, the search results based on the search of the storage location.

12. The method of claim 1, wherein the generating of the search results comprises:
    determining, by the at least one processor, an app programming interface (API) corresponding to the specific app;
    querying, using the user device, the API using the search query; and
    receiving, at the user device, the search results from the API in response to the querying of the API.

13. The method of claim 1, wherein the generating of the search results comprises:
    transmitting, using the user device, the search query to a search system configured to generate search results in response to a received search query; and
    receiving, at the user device, the search results from the search system in response to transmitting the search query.

14. The method of claim 13, further comprising transmitting, using the user device, an indication of the specific app to the search system,
    wherein the receiving of the search results from the search system comprises receiving the search results in response to transmitting the indication.

15. The method of claim 1, wherein the generating of the search results comprises:
    launching, using the user device, the specific app; and
    providing, using the user device, one or more commands to the specific app to cause the at least one processor to generate the search results.

16. The method of claim 1,
    wherein the search results include one or more app access mechanisms (AAMs),
    wherein each AAM references the specific app and indicates one or more operations for the specific app to perform, and
    wherein performing the one or more operations sets the specific app into one of a plurality of states.

17. The method of claim 1, wherein the displaying of the search results comprises forwarding the search results for display as one or more user selectable links to a computing device other than the user device.

18. The method of claim 1, wherein the displaying of the search results comprises:
    launching, using the user device, the specific app; and
    displaying, using a graphical user interface (GUI) of the specific app, the search results as one or more user selectable links.

19. The method of claim 1, wherein the search results specify at least a first state of a first specific app, a second state of the first specific app, and a third state of a second specific app.

20. The method of claim 1, wherein the searching of the content of the specific app including searching of content of a plurality of native apps that are installed on the user device.

21. The method of claim 1, wherein the user input is performed while the search query is received.

22. A computing device for improving search results, the computing device comprising:
- a touchscreen configured to display an application and receive a user input;
- an input/output component configured to receive a search query;
- one or more memory components configured to store computer-readable instructions; and
- at least one processor configured to execute the computer-readable instructions,
- wherein the computer-readable instructions, when executed by the at least one processor, cause the at least one processor to:
  - receive the user input at the touchscreen, the user input selecting the application and receive the search query using the input/output component,
  - in response to receiving the user input and the search query, search content of a specific app stored in the one or more memory components based on the user input and the search query without opening the specific app,
  - wherein the specific app corresponds to the application selected by the user input and the specific app is executable on the computing device,
  - generate search results based on the searched content of the specific app, each of the search results being a user selectable link to a different state of the specific app,
  - display, on the touchscreen, the search results,
  - receive, at the touchscreen, another user input selecting one of the search results, and
  - display, on the touchscreen, a screen associated with a state of the specific app corresponding to the selected search result.

* * * * *